(12) United States Patent
Jun

(10) Patent No.: US 12,701,477 B2
(45) Date of Patent: Aug. 4, 2026

(54) ELECTRONIC APPARATUS AND CONTROL METHOD THEREOF

(71) Applicant: SAMSUNG ELECTRONICS CO., LTD., Suwon-si (KR)

(72) Inventor: Joonsik Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 18/376,686

(22) Filed: Oct. 4, 2023

(65) Prior Publication Data

US 2024/0147327 A1 May 2, 2024

Related U.S. Application Data

(63) Continuation of application No. PCT/KR2023/011413, filed on Aug. 3, 2023.

(30) Foreign Application Priority Data

Nov. 1, 2022 (KR) ........................ 10-2022-0143649

(51) Int. Cl.
*H04W 36/08* (2009.01)
*H04W 48/08* (2009.01)
*H04W 84/12* (2009.01)

(52) U.S. Cl.
CPC ........... *H04W 36/08* (2013.01); *H04W 48/08* (2013.01); *H04W 84/12* (2013.01)

(58) Field of Classification Search
CPC ............................. H04W 36/08; H04W 48/08
See application file for complete search history.

(56) References Cited

U.S. PATENT DOCUMENTS

| | | | |
|---|---|---|---|
| 10,002,524 B2 | 6/2018 | Shim et al. | |
| 10,051,494 B2 | 8/2018 | Rengarajan et al. | |
| 10,321,393 B2 | 6/2019 | Ko et al. | |
| 10,749,384 B2 | 8/2020 | Park et al. | |
| 10,911,544 B2 | 2/2021 | Cook | |
| 10,924,154 B2 | 2/2021 | Kim et al. | |
| 11,368,363 B2 | 6/2022 | Anantharaman et al. | |

(Continued)

FOREIGN PATENT DOCUMENTS

| | | |
|---|---|---|
| CN | 113438102 A | 9/2021 |
| JP | 6794474 B2 | 12/2020 |

(Continued)

OTHER PUBLICATIONS

International Search Report and Written Opinion (PCT/ISA/210 and PCT/ISA/237) dated Nov. 21, 2023, issued by International Searching Authority for International Application No. PCT/KR2023/011413.

(Continued)

*Primary Examiner* — Justin Y Lee
(74) *Attorney, Agent, or Firm* — Sughrue Mion, PLLC

(57) ABSTRACT

Provided is an electronic apparatus configured to operate a communication interface in an access point (AP) mode, based on first AP information, and based on at least one external device being communicatively connected during operation of the communication interface in the AP mode, transmit, through the communication interface, second AP information different from the first AP information to the at least one external device.

20 Claims, 19 Drawing Sheets

(56)        References Cited

U.S. PATENT DOCUMENTS

| | | |
|---|---|---|
| 11,412,577 B2 | 8/2022 | Kim et al. |
| 2014/0250513 A1* | 9/2014 | Cao ...................... H04W 12/50 |
| | | 726/7 |
| 2015/0319318 A1 | 11/2015 | Hashimoto et al. |
| 2017/0272963 A1 | 9/2017 | Rengarajan et al. |
| 2018/0343165 A1* | 11/2018 | Anantharaman ... H04L 41/0886 |
| 2019/0006891 A1 | 1/2019 | Park et al. |
| 2020/0076466 A1 | 3/2020 | Kim et al. |
| 2020/0314958 A1 | 10/2020 | Kim et al. |
| 2021/0068068 A1 | 3/2021 | Lee |
| 2021/0251019 A1 | 8/2021 | Sayed |
| 2022/0255908 A1 | 8/2022 | Kang et al. |

FOREIGN PATENT DOCUMENTS

| | | |
|---|---|---|
| KR | 10-2018-0109616 A | 10/2018 |
| KR | 10-2019-0003194 A | 1/2019 |
| KR | 10-2062580 B1 | 2/2020 |
| KR | 10-2020-0116285 A | 10/2020 |
| KR | 10-2021-0051084 A | 5/2021 |
| KR | 10-2022-0067844 A | 5/2022 |
| KR | 10-2438713 B1 | 9/2022 |

OTHER PUBLICATIONS

Communication dated Sep. 2, 2025 issued by the European Patent Office in European Patent Application No. 23885965.6.

* cited by examiner

| SSID | Password | MAC address* |
|---|---|---|
| SSID_1 | xxxxxx | AA:BB:CC:DD:11:48 |

FIG.  12B

| SSID | Password | MAC address* |
|------|----------|--------------|
| SSID_1 | xxxxxx | AA:BB:CC:DD:11:48 |
| SSID_2 | yyyyyy | AA:BB:CC:DD:11:77 |

ELECTRONIC APPARATUS AND CONTROL METHOD THEREOF

CROSS-REFERENCE TO RELATED APPLICATION(S)

This application is a bypass continuation of PCT International Application No. PCT/KR2023/011413, filed on Aug. 3, 2023, and claims priority to Korean Patent Application No. 10-2022-0143649, filed on Nov. 1, 2022, in the Korean Intellectual Property Office, the disclosures of which are incorporated herein by reference in their entireties.

BACKGROUND

1. Field

The disclosure relates to an electronic apparatus and a control method thereof and, more specifically, to an electronic apparatus configured to perform wireless fidelity (Wi-Fi) communication and a control method thereof.

2. Description of Related Art

The 21$^{st}$ century is referred to as the Information Age. In the Information Age, obtaining information as much as possible and as quick as possible is essential. Once, a vehicle mount terminal such as a desktop PC has been used as a representative data communication equipment, but while entering the 21$^{st}$ century, a portable small terminal, such as a notebook, a personal digital assistant (PDA), or a smartphone, became popular.

Various wireless communication technologies for portable small terminals are being developed. Among them, wireless fidelity (Wi-Fi) communication in which local area network (LAN) communication for a computer becomes wireless, has advantages of compatibility with various devices and rapid communication speed.

SUMMARY

According to an aspect of the disclosure, an electronic apparatus includes: a communication interface; a memory storing at least one instruction; and one or more processors operatively connected to the communication interface and the memory. The one or more processors is configured to execute the at least one instruction where the to: operate the communication interface in an access point (AP) mode, based on first AP information, and based on at least one external device being communicatively connected during operation of the communication interface in the AP mode, transmit, through the communication interface, second AP information different from the first AP information to the at least one external device.

The one or more processors may be further configured to execute the at least one instruction to: control the communication interface to terminate the AP mode, based on a preset event; where the preset event comprises at least one of an event in which a preset time has elapsed after operating in the AP mode, an event in which a preset time has elapsed after transmitting the second AP information to the at least one external device, an event in which the second AP information is transmitted to each device in a target device list, or an event in which an end request of the AP mode is identified.

The target device list may be a list stored in the memory.

The one or more processors may be further configured to execute the at least one instruction to: based on a communication connection based on the first AP information being released, obtain the second AP information; communicate with an AP device, through the communication interface, based on the second AP information; and control the communication interface to operate the communication interface in the AP mode, based on the first AP information.

The one or more processors may be further configured to execute the at least one instruction to: operate the communication interface in the AP mode, based on the first AP information and a preset event; where the preset event comprises at least one of an event in which a communication connection based on the first AP information is identified as being released, or an event in which a user command for operating in an AP mode is identified based on the first AP information.

The one or more processors may be further configured to execute the at least one instruction to: based on the first AP information being released, obtain the second AP information from a user terminal through a Wi-Fi communication by executing SoftAP function, and obtain the target device list through the Wi-Fi communication; or obtain the target device list from the user terminal through a communication method different from the Wi-Fi communication.

The one or more processors may be further configured to execute the at least one instruction to: control the communication interface to transmit, to the user terminal, a request signal requesting whether to transmit the second AP information to the at least one external device; and receive from the user terminal, through the communication interface, the target device list based on the request signal.

The one or more processors may be further configured to execute the at least one instruction to: with a server, through the communication interface, via the AP device, based on the second AP information, to obtain the target device list from the server.

The one or more processors may be further configured to execute the at least one instruction to: based on identifying a device not receiving the second AP information, from among the devices included in the target device list, after transmitting the second AP information to the at least one external device and the AP device ends, communicate with the AP device based on the second AP information and control the communication interface to transmit the information about the identified device to the server.

The one or more processors may be further configured to execute the at least one instruction to: operate the communication interface in the AP mode based on a preset event; where the preset event comprises at least one of an event in which a communication connection based on the first AP information is released in the at least one external device, or an event in which a user command to operate in the AP mode is identified based on the first AP information.

The electronic apparatus may further include: a display; where the one or more processors may be further configured to execute the at least one instruction to: after the AP mode is terminated, control the display to display a user interface comprising a device which is not connected by Wi-Fi communication, from among the devices included in the target device list, based on the second AP information.

According to an aspect of the disclosure, a method of controlling an electronic apparatus includes: operating a communication interface of the electronic apparatus in an access point (AP) mode based on first AP information; and based on at least one external device being communicatively connected during operation of the communication interface in the AP mode, transmitting second AP information different from the first AP information to the at least one external device.

The method may further include: terminating the AP mode based on a preset event, where the preset event comprises at least one of an event in which a preset time has elapsed after operating in the AP mode, an event in which a preset time has elapsed after transmitting the second AP information to the at least one external device, an event in which the second AP information is transmitted to each device in a target device list, or an event in which an end request of the AP mode is identified.

The operating the communication interface of the electronic apparatus in the AP mode may further include: based on a communication connection based on the first AP information being released, obtaining the second AP information; communicating with an AP device based on the second AP information; and operating the communication interface in the AP mode based on the first AP information.

The method may further include: based on the first AP information being released, obtaining the second AP information from a user terminal through a Wi-Fi communication by executing SoftAP function; and obtaining the target device list through the Wi-Fi communication.

The method may further include: obtaining the target device list from a user terminal through a communication method different from a Wi-Fi communication.

The method may further include: transmitting a request signal to the user terminal, the request signal requesting whether to transmit the second AP information to the at least one external device; and receiving from the user terminal the target device list based on the request signal.

The method may further include: communicating with a server, via the AP device, based on the second AP information, to obtain the target device list from the server.

The method may further include: based on identifying a device not receiving the second AP information, from among the devices included in the target device list, after transmitting the second AP information to the at least one external device and the AP device ends, communicating with the AP device based on the second AP information, to transmit the information about the identified device, through the communication interface, to the server.

According to an aspect of the disclosure, a non-transitory computer readable medium stores storing computer readable program code or instructions which are executable by a processor to perform a method of controlling an electronic apparatus. The method includes: operating a communication interface of the electronic apparatus in an access point (AP) mode based on first AP information; and based on at least one external device being communicatively connected during operation of the communication interface in the AP mode, transmitting second AP information different from the first AP information to the at least one external device.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 12A and 12B are diagrams illustrating various types of information according to an embodiment;

DETAILED DESCRIPTION

Figure 1:
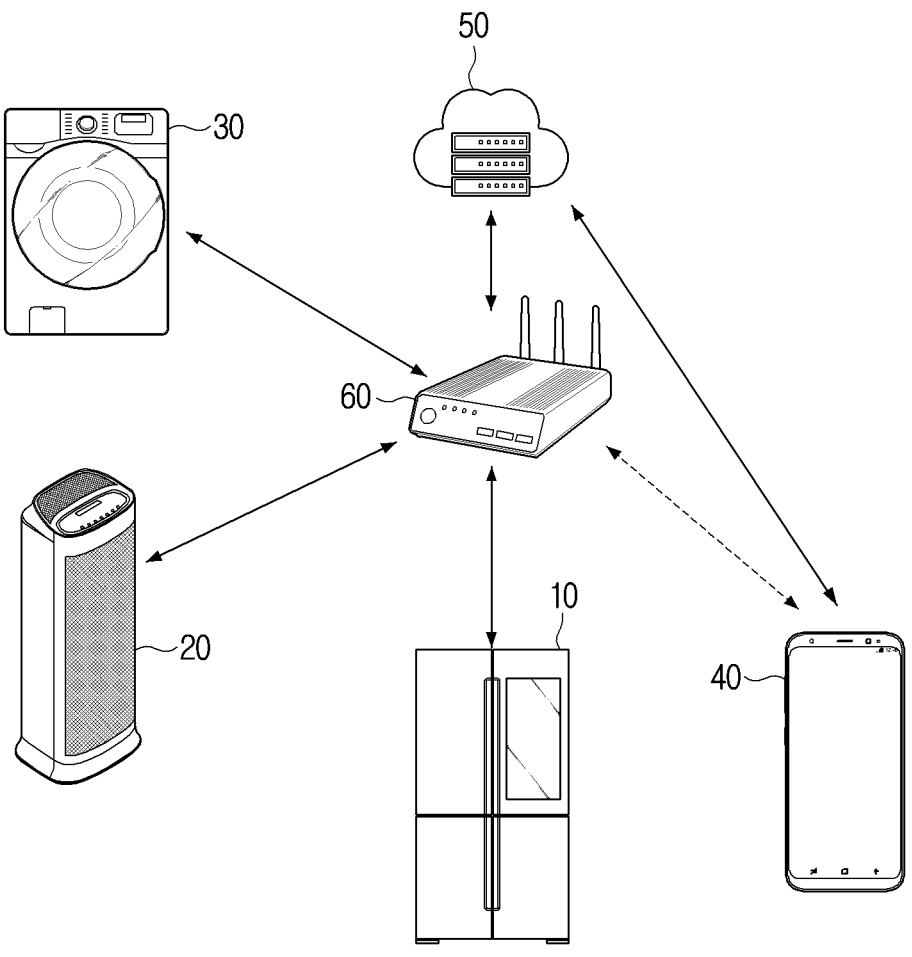
FIG. 1 is a diagram illustrating an operation of an electronic system according to an embodiment.

Hereinafter, embodiments of the present disclosure will be described in detail with reference to the accompanying drawings, where similar reference characters denote corresponding features consistently throughout.

The terms used in the disclosure and the claims are general terms identified in consideration of the functions of the various embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

In the disclosure, the expressions "have," "may have," "including," or "may include" may be used to denote the presence of a feature (e.g., a component, such as a numerical value, a function, an operation, a part, or the like), and does not exclude the presence of additional features.

In the disclosure, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components.

In addition, a description that one element (e.g., a first element) is "(operatively or communicatively) coupled with/ to" or "connected to" another element (e.g., a second element) should be interpreted to include both the case that the one element is directly coupled to the other element, and the case that the one element is coupled to the another element through still another element (e.g., a third element).

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense.

Instead, under some circumstances, "a device configured to" may indicate that such a device can perform an action along with another device or part. For example, the expression "a processor configured (or set) to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

In the example embodiments, terms such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and may be realized in at least one processor.

It is understood that various elements and regions in the figures may be shown out of scale. Accordingly, the scope of the disclosure is not limited by the relative sizes or spacing drawn from the accompanying drawings.

FIG. 1 is a diagram illustrating an operation of an electronic system according to an embodiment.

Referring to FIG. 1, an electronic system may include a plurality of devices 10, 20, 30, a user terminal 40, a server 50, and an AP device 60.

A plurality of devices 10, 20, 30 may be various Internet of Things (IoT) devices which may be controlled through an application installed in the user terminal 40. For example, the plurality of devices 10, 20, 30 may be implemented as various household devices such as a TV, an air purifier, a washing machine, a refrigerator, a dryer, an oven, and the like. According to an embodiment, a plurality of devices (e.g., a first device 10, a second device 20, a third device 30) may be an IoT device supporting a Wi-Fi module. The Wi-Fi module may include Wi-Fi firmware and a Wi-Fi driver capable of recognizing the corresponding Wi-Fi firmware in an operating system of the electronic apparatus 100. Here, Wi-Fi firmware (or a wireless LAN card) is hardware, and may be mounted inside a main body of a plurality of devices 10, 20, 30 or mounted on a plurality of devices 10, 20, 30 by using an interface (e.g., a universal serial bus (USB)). For example, Wi-Fi firmware may be implemented as at least one of PCI, PCI-Express, PCMCIA, or USB.

The user terminal 40 may download an application from a server providing an application and install the application. For example, the application may be an IoT application for registering a plurality of devices 10, 20, 30 in the server 50 and managing the same. The application is software that is directly used by a user on the OS, and may be provided in the form of an icon interface on the screen of the user terminal 40.

In this example, a user may execute an application (hereinafter, referred to as an "IoT application") in the user terminal 40, enter a user account, and log in to the server 50 through an inputted user account, and the user terminal 40 may communicate with the server 50 based on the logged in user account.

The server 50 may manage a plurality of devices 10, 20, 30 registered to the user account. Here, the server 50 may be implemented with a cloud server, but is not limited thereto.

According to an embodiment of the disclosure, the user terminal 40 may communicatively connect and register a plurality of devices 10, 20, 30 to the server 50 by using easy setup technology. According to the easy setup technology, a plurality of devices 10, 20, 30 may operate in an AP mode, and a beacon signal including identification information (e.g., SSID) transmitted by a plurality of devices 10, 20, 30 may be scanned in the user terminal 40. In this case, the user terminal 40 may provide a UI including identification information corresponding to the scanned beacon signal, and when one of the identification information is selected, the user terminal 40 may communicate with a device corresponding to the selected identification information. The user terminal 40 may transmit information necessary for onboarding to a plurality of devices 10, 20, 30 through a communication connection, so that the Internet connection of the plurality of devices 10, 20, 30 and registration to the server 50 may be conveniently performed.

In an embodiment, easy setup technology may be divided into D2D in which the user terminal 40 and each of a plurality of devices 10, 20, 30 are connected through D2D channel and the user terminal 40 transmits information (e.g., information about the AP device 60) necessary for connection of a plurality of devices 10, 20, 30, and D2S to connect a plurality of devices 10, 20, 30 to the AP device 60 and the server 50 based on the received information. For example, the user terminal 40 completing the D2D may maintain a standby state until a D2S of a plurality of devices 10, 20, 30 is completed and a registration completion notification is received from the server 50.

When a plurality of devices 10, 20, 30 are registered in a user account through easy setup technology, the server 50 may transmit data received from a plurality of devices 10, 20, 30 to the user terminal 40 communicating with the server 50 based on the user account in which a plurality of devices 10, 20, 30 are registered. In addition, when a control command for the plurality of devices 10, 20, 30 is received from the user terminal 40, the server 50 may transmit a control signal corresponding to the received control command to the plurality of devices 10, 20, 30. In this case, the user terminal 40 implemented with a smartphone, a mobile phone, a tablet, a laptop, or the like may be connected to the server 50 through a mobile communication network such as LTE, 5G, or the like, or may access the server 50 through the AP device 60 or another AP device, and may transmit a control command for the plurality of devices 10, 20, 30 to the server 50 through the IoT application installed in the user terminal 40.

According to an embodiment, the Wi-Fi communication of the plurality of devices 10, 20, 30 may be disconnected. For example, when the SSID and/or password of the AP device 60 is changed for security, etc., when the AP device 60 is changed to another AP device (for the reason of taking back by a communication company), when the SSID and password of the other AP device 60 should be reset, or the like, the Wi-Fi communication of the devices performing the Wi-Fi communication may all be disconnected based on the AP information before change, and accordingly, communication with the server 50 may be disconnected. In this case, there is a need for a method in which a plurality of devices 10, 20, 30 may automatically access new AP information and be connected to the server 50. Although three devices 10, 20, and 30 are illustrated in FIG. 1, in some embodiments, the plurality of devices 10 and 20 are assumed to be two for convenience of description.

Figure 2:
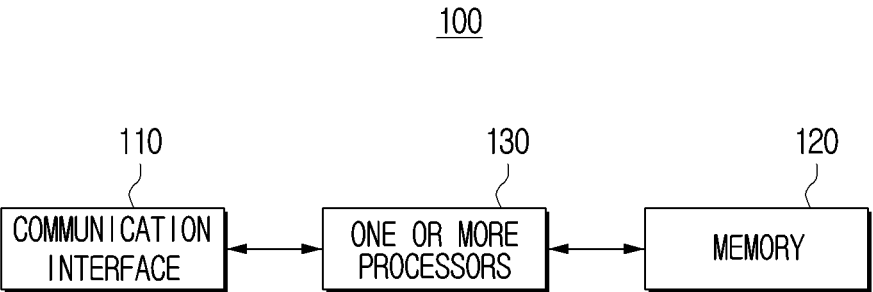
FIG. 2 is a block diagram illustrating a configuration of an electronic apparatus according to an embodiment.

FIG. 2 is a block diagram illustrating a configuration of an electronic apparatus according to an embodiment.

Referring to FIG. 2, the electronic apparatus 100 includes the communication interface 110, the memory 120, and one or more processors 130.

In an embodiment, the electronic apparatus 100 may be one of a plurality of devices 10, 20, 30 illustrated in FIG. 1. Hereinbelow, for convenience of description, the electronic apparatus 100 may be the first device 10 among the plurality of devices 10, 20, 30.

The communication interface 110 may communicate with an external device. The communication interface 110 may include a Wi-Fi module supporting AP-based Wi-Fi (Wi-Fi, wireless LAN network) communication method. The embodiment is not limited thereto, and the communication interface 110 may further include a communication module that supports communication methods such as Bluetooth, near field communication (NFC), Zigbee, wired/wireless local area network (LAN), wide area network (WAN), Ethernet, IEEE 1394, mobile high-definition link (MHL), advanced encryption standard (AES)/European broadcasting union (EBU), optical, coaxial, or the like.

The memory 120 may be electrically connected to one or more processors 130 and may store data necessary for various embodiments of the disclosure. The memory 120 may be implemented as a memory embedded in the electronic apparatus 100, or may be implemented as a removable or modular memory in the electronic apparatus 100, according to the data usage purpose. For example, data for driving the electronic apparatus 100 may be stored in a memory embedded in the electronic apparatus 100, and data for an additional function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive or a solid state drive (SSD), or the like. In the case of a memory detachably mounted to the electronic apparatus 100, the memory may be implemented as a memory card (e.g., a compact flash (CF), secure digital (SD), micro secure digital (micro-SD), mini secure digital (mini-SD), extreme digital (xD), multi-media card (MMC), etc.), an external memory (e.g., a USB memory) connectable to the USB port, or the like, but the memory is not limited thereto.

According to an embodiment, the memory 120 may store at least one instruction for controlling the electronic apparatus 100 or a computer program including instructions.

According to an embodiment, the memory 120 may store first AP information. The first AP information may include Service Set Identifier (SSID) information and password information. Additionally, the first AP information may further include band information, channel information, and the like. For example, since the electronic apparatus 100 is in a Wi-Fi communication-connected state based on the first AP information, the first AP information may be stored in the memory 120. For example, the first AP information may be AP information corresponding to the AP device 60 illustrated in FIG. 1.

According to an embodiment, the memory 120 may store a target device list received from at least one of the user terminal 40, the server 50, or the AP device 60. The target device list may include identification information of devices. Here, the identification information may include various types of information capable of identifying the device. For example, the information may be in various forms such as a name, a model, a device token, and the like.

For example, the target device list may include information about target devices to which communication is connected, based on the first AP information. In an embodiment, the target device list may include IoT devices registered in the same user account among target devices (that is, devices located in a certain space) that are communicatively connected based on the first AP information. For example, when a device located in a predetermined space and connected to the first AP information is registered in another user account, the device may not be included in the target device list. However, the embodiment is not limited thereto, and any target device communicatively connected based on the first AP information may be included in a target device list regardless of a user account, depending on circumstances. For example, when a target device list is received from the AP device 60 and all the communicatively connected devices based on the first AP information are included in the list received from the AP device 60 regardless of an account, only devices registered in the same user account may not necessarily be included in the target device list.

According to an embodiment, the memory 120 may be implemented as a single memory for storing data generated in various operations according to the disclosure. However, according to an embodiment, the memory 120 may be implemented to include a plurality of memories each storing different types of data or storing data generated in different stages, respectively.

In the above-described embodiment, it has been described that various data is stored in the memory 120 external to the one or more processors 130, but at least some of the above-described data may be stored in an internal memory of the at least one processor 130 according to an implementation example of at least one of the electronic apparatus 100 or one or more processors 130.

The at least one processor 130 may perform an operation of the electronic apparatus 100 according to various embodiments by executing at least one instruction stored in the memory 120.

The one or more processors 130 may control overall operations of the electronic apparatus 100. To be specific, the one or more processors 130 may be electrically connected to each configuration of the electronic apparatus 100 and control overall operations of the electronic apparatus 100. For example, one or more processors 130 may be electrically connected to the communication interface 110 and the memory 120 and may control overall operations of the electronic apparatus 100. The one or more processors may be composed of one or a plurality of processors.

The at least one processor 130 may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. The one or more processors 130 may control one or any combination of other components of the electronic apparatus and may perform operations or data processing relating to the communication. The one or more processors 130 may execute one or more programs or instructions stored in the memory. For example, one or more processors may perform a method in accordance with an embodiment of the disclosure by executing one or more instructions stored in a memory.

When a method according to an embodiment of the disclosure includes a plurality of operations, a plurality of operations may be performed by one processor or may be performed by a plurality of processors. For example, when a first operation, a second operation, and a third operation are performed by a method according to an embodiment, all of the first operation, the second operation, and the third operation may be performed by the first processor, the first operation and the second operation may be performed by a first processor (e.g., a general purpose processor), and the third operation may be performed by a second processor (e.g., an artificial intelligence dedicated processor).

The one or more processors 130 may be implemented as a single core processor including one core, or may be implemented as one or more multicore processors including a plurality of cores (e.g., homogeneous multi-cores or heterogeneous multi-cores). When the one or more processors 130 are implemented as a multi-core processor, each of the plurality of cores included in the multi-core processor may include a processor internal memory such as a cache memory and an on-chip memory, and a common cache shared by the plurality of cores may be included in the multi-core processor. In addition, each of a plurality of cores (or a part of a plurality of cores) included in the multi-core processor may independently read and perform a program command for implementing a method according to an embodiment of the disclosure, and may read and perform a program command for implementing a method according to an embodiment of the disclosure in connection with all (or a part of) a plurality of cores.

When the method according to an embodiment of the disclosure includes a plurality of operations, the plurality of operations may be performed by one core among a plurality of cores included in the multi-core processor or may be performed by the plurality of cores. For example, when a first operation, a second operation, and a third operation are performed by a method according to an embodiment, all the first operation, second operation, and third operation may be performed by a first core included in the multi-core processor, and the first operation and the second operation may be performed by a first core included in the multi-core processor and the third operation may be performed by a second core included in the multi-core processor.

In the embodiments of the disclosure, the processor may mean a system-on-chip (SoC), a single core processor, a multi-core processor, or a core included in a single core processor or a multi-core processor in which one or more processors and other electronic components are integrated, wherein the core may be implemented as a CPU, a GPU, an APU, a MIC, a DSP, an NPU, a hardware accelerator, or a machine learning accelerator, but embodiments of the disclosure are not limited thereto. Hereinafter, for convenience of description, the at least one processor 130 may be referred to as a processor 130.

Figure 3:
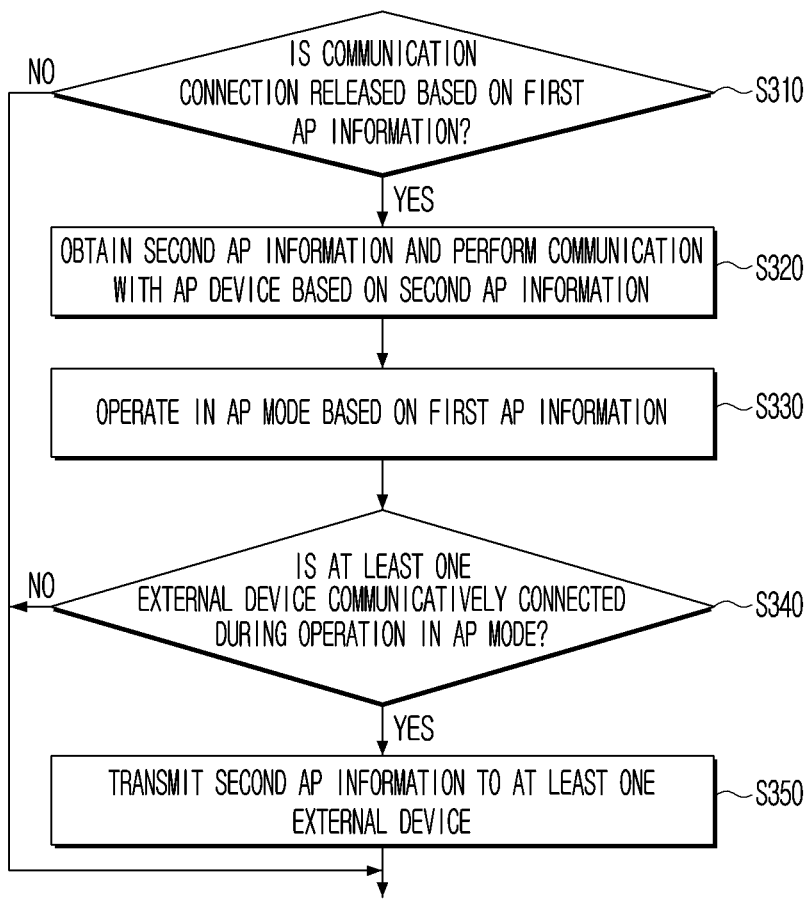
FIG. 3 is a flowchart illustrating a communication method of an electronic apparatus according to an embodiment.

FIG. 3 is a flowchart illustrating a communication method of an electronic apparatus according to an embodiment.

Referring to FIG. 3, the processor 130 may control the communication interface 110 in operation S320 to obtain second AP information and perform communication with an AP device based on the second AP information when the communication connection based on the first access point (AP) information is released in operation S310: YES. Here, the communication interface 110 may perform Wi-Fi communication through a Wi-Fi communication module.

In an embodiment, a communication connection based on first AP information may be a connection through an AP device 60 illustrated in FIG. 1, but an AP device communicatively connected based on the second AP information may be the same AP device or a different AP device as the AP device 60 illustrated in FIG. 1. However, the second AP information may be information different from the first AP information. For example, at least one of an SSID or a password included in the second AP information may be different from at least one of an SSID or a password included in the first AP information. Subsequently, the processor 130 may control the communication interface 110 to operate in the AP mode based on the first AP information in operation S330. However, if the second AP information is acquired, the processor 130 may control the communication interface 110 to operate in the AP mode based on the first AP information without performing communication with an AP device (not shown). That is, the processor 130 may perform operation S330 without performing some operations in operation S320.

In an embodiment, the processor 130 may control the communication interface 110 to operate in an AP mode when the processor 130 is communicatively connected to an AP device based on the second AP information. For example, after confirming that the second AP information is valid AP information capable of communication connection, the processor 130 may control the communication interface 110 to operate in the AP mode. For example, when the processor 130 is communicatively connected to the server 50 based on the second AP information, the processor 130 may identify that the second AP information is valid AP information capable of communication connection. However, the operation of checking whether the second AP information is valid AP information is not necessarily required, and the communication interface 110 may be controlled to operate in the AP mode based on the first AP information immediately without checking whether communication connection with the AP device is attempted based on the second AP information (or after acquiring the second AP information).

Thereafter, if at least one external device is communicatively connected while operating in the AP mode based on the first AP information in operation S340: YES, the processor 130 may transmit the second AP information to the communicatively connected at least one external device in operation S350.

In an embodiment, the processor 130 may update (or change) the first AP information stored in the at least one external device to the second AP information or transmit a command (or signal) for adding the second AP information as new AP information to the at least one external device together with the second AP information. In this case, the at least one external device may update (or change) the prestored first AP information to the second AP information or add the second AP information to new AP information (e.g., AP information having the highest priority when the communication is connected), based on the command (or signal) received together with the second AP information.

In an embodiment, at least one external device may update (or change) pre-stored first AP information to second AP information or add second AP information as new AP information when new AP information, that is, second AP information, is received from the electronic apparatus 100 while communicating with the electronic apparatus 100 in the AP mode based on the first AP information. In other words is, even if there is no separate command received with the second AP information, the at least one external device may update (or change) the pre-stored first AP information to the second AP information or add the second AP information to the new AP information based on receiving of the new AP information even if there is no separate command received together with the second AP information.

Figure 4:
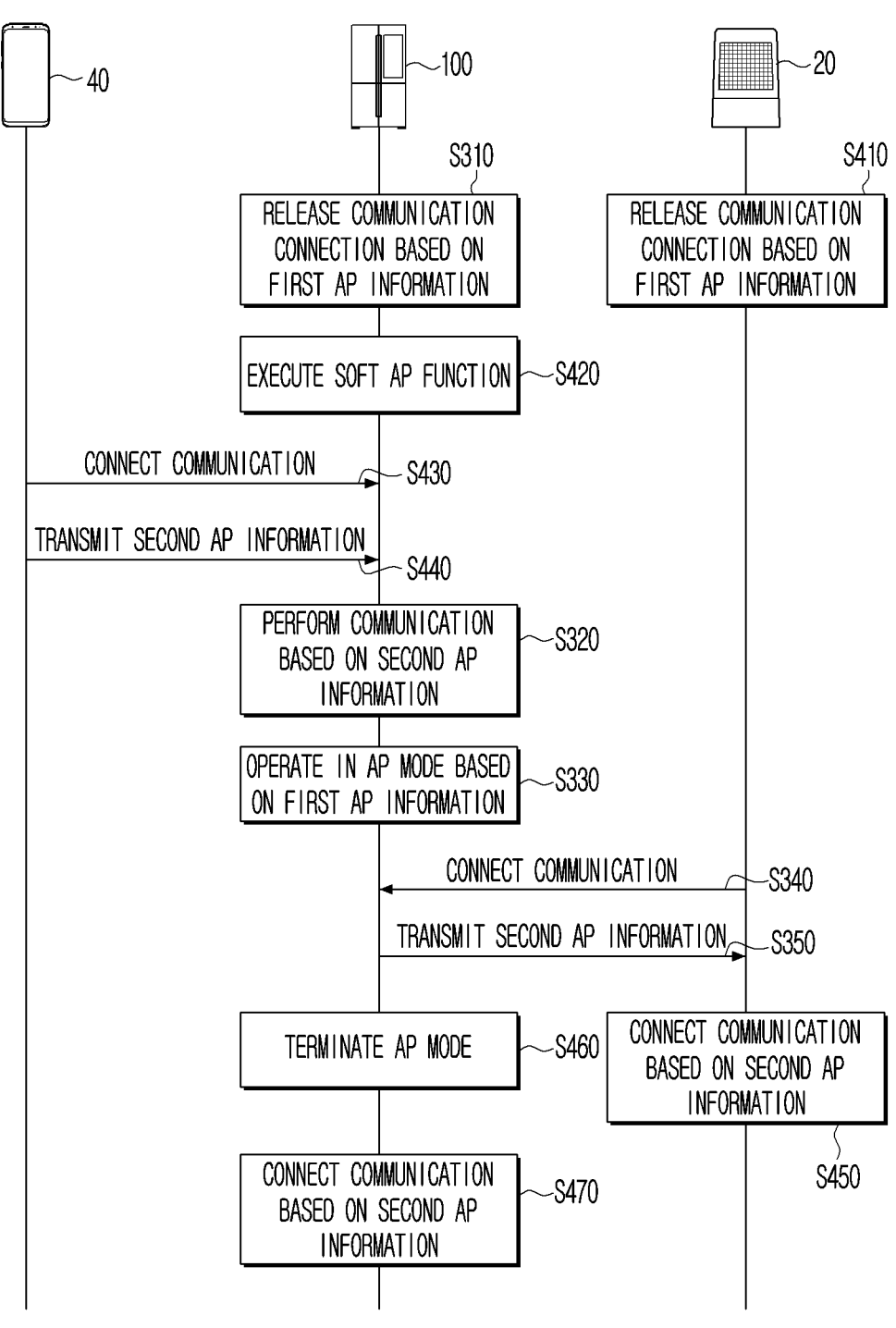
FIG. 4 is a sequence diagram specifically illustrating a communication method of an electronic apparatus according to an embodiment.

FIG. 4 is a sequence diagram specifically illustrating a communication method of an electronic apparatus according to an embodiment.

Referring to FIG. 4, for convenience of description, the same reference numeral will be used for the operation of the electronic apparatus 100 illustrated in FIG. 3. As shown in FIG. 2, the electronic apparatus 100 assumes to be a first device 10 among the plurality of devices 10, 20 shown in FIG. 1. In addition, for convenience of description, only the second device 20 other than the first device 10 will be assumed and described. However, the same operation as that of the second device 20 may be performed even in the third device 30.

In an embodiment, in a state where the electronic apparatus 100 and the second device 20 are capable of performing Wi-Fi communication based on the first AP information, if an event in which communication connection is impossible is generated based on the first AP information, the Wi-Fi communication connection of the electronic apparatus 100 and the second device 20 may be released in operation S310, S410. For example, when the SSID and password of the AP device are changed for security reason, etc., if the AP device is changed to another AP device (reason such as taking back by a communication company), and the SSID and password of the other AP device should be reset, etc., the communication connection of the devices performing the Wi-Fi communication may be released based on the first AP information, which is the AP information before change.

When the communication connection based on the first AP information is released in operation S310, the electronic apparatus 100 may execute a SoftAP function in operation S420. For example, the SoftAP function may be manually executed or automatically executed according to a preset event.

In an embodiment, a user may select one of devices with released communication connection including the electronic apparatus 100 and the second device 20 to operate a soft wireless AP function. For example, a soft mobile AP function button provided in the electronic apparatus 100 may be pressed or a menu displayed on a display of the electronic apparatus 100 may be manipulated to execute a SoftAP function. However, the embodiment is not limited thereto, and the SoftAP function may be executed based on various methods such as a remote control signal by a remote control, a remote control in a user terminal in which an application capable of remote control function is executed, a user voice command, a user gesture command, and user gaze recognition, or the like. Here, the user terminal may be the user terminal 40 of FIG. 1 or another user terminal.

In an embodiment, when a communication connection based on first AP information is released, a device (e.g., a master device) executing a SoftAP function may be preset. For example, when a communication connection based on the first AP information is released, the electronic apparatus 100 is pre-set as a master device for executing a SoftAP function, and may automatically execute a SoftAP function.

In an embodiment, when the electronic apparatus 100 receives, from the user terminal 40, a signal so that the electronic apparatus 100 executes the SoftAP function through another communication method (e.g., Bluetooth) other than the Wi-Fi communication, a SoftAP function may be executed. In this case, the user terminal 40 may automatically transmit, to the electronic apparatus 100, a signal for executing the SoftAP function according to various events, not a user command.

For example, when it is identified that the Wi-Fi communication connection of the electronic apparatus 100 registered in the application is released, the user terminal 40 may transmit, to the electronic apparatus 100, a signal for executing the SoftAP function. As another example, when it is identified that the Wi-Fi communication connection has been released when the user terminal 40 is in a Wi-Fi communication-connected state based on the first AP information, it is possible to identify that the Wi-Fi communication connection of the plurality of devices 10, 20, 30 is released and transmit a signal for executing the SoftAP function to the electronic apparatus 100. In this case, the user terminal 40 may identify a specific device of the plurality of devices 10, 20, 30, from which the communication connection has been released, as a specific device for executing a soft connect AP function. For example, information about a specific device may be pre-stored in the electronic apparatus 100 based on a user command or a signal received from the server 50. For example, a specific device may be selected and stored through a menu provided in an IoT application. When the electronic apparatus 100 executes a SoftAP function and operates in the AP mode, the user terminal 40 may be communicatively connected to the electronic apparatus 100 in operation S430. For example, device to device (D2D) communication channel may be formed between the electronic apparatus 100 and the user terminal 40 by broadcasting a specific SSID by the electronic apparatus 100 and scanning and joining a specific SSID by the user terminal 40.

When the user terminal 40 is communicatively connected to the electronic apparatus 100 in operation S430, the user terminal 40 may transmit the second AP information to the electronic apparatus in operation S440. For example, the user terminal 40 may transmit the second AP information to the electronic apparatus 100 through the D2D channel. In this case, the user terminal 40 may transmit the prestored second AP information to the electronic apparatus 100 or transmit the second AP information received from the server 50 to the electronic apparatus 100. For example, the user may scan the SSID of the second AP information by using the user terminal 40, and the second AP information may be pre-stored in the user terminal 40 by inputting a password known by the user. In an embodiment, the user may store the second AP information by inputting both the SSID and password of the second AP information to the user terminal 40. In an embodiment, the server 50 may have already known the second AP information, and the user terminal 40 may receive the second AP information from the server 50 and transmit the second AP information to the electronic apparatus 100.

As such, the operation in which the electronic apparatus 100 receives the second AP information from the user terminal 40 by executing the SoftAP function may use the existing Easy Setup technology, but the embodiment is not limited thereto, and various technologies may be applied within the limit in which the electronic apparatus 100 may receive the second AP information from the user terminal 40.

For example, a separate function, not a related-art easy setup function, that is, a function that the electronic apparatus 100 may receive AP information from the user terminal 40 by executing the SoftAP function may be separately implemented.

In an embodiment, the electronic apparatus 100 may receive second AP information from the user terminal 40 through a communication method other than a Wi-Fi communication method such as Bluetooth, NFC, or the like. The event of receiving the second AP information from the user terminal 40 through another communication method such as Bluetooth, NFC, or the like without operating in the AP mode may be diverse. For example, the electronic apparatus 100 may request the second AP information to the user terminal 40, or the user terminal 40 may transmit the second AP information to the electronic apparatus 100 without request by the electronic apparatus 100.

In an embodiment, when the electronic apparatus 100 requests second AP information to the user terminal 40, a specific button provided in the electronic apparatus 100 may be pressed, or a user command may be input through a menu displayed on a display of the electronic apparatus 100. The embodiment is not limited thereto, and the electronic apparatus 100 may request the second AP information to the user terminal 40 based on various methods such as a remote control signal, a user voice command, a user gesture command, and user gaze recognition in a user terminal in which an application capable of performing a remote control signal or a remote control function by a remote controller is being executed. Here, the user terminal may be the user terminal 40 of FIG. 1 or another user terminal. In an embodiment, the electronic apparatus 100 may be pre-set to request the second AP information to the user terminal 40 when a communication connection based on the first AP information is released.

According to another embodiment, when the user terminal 40 transmits the second AP information to the electronic apparatus 100 without a request of the electronic apparatus 100, the user terminal 40 may transmit the second AP information to the electronic apparatus 100 when it is identified that the Wi-Fi communication connection of the electronic apparatus 100 registered in the application is released. As another example, when it is identified that the Wi-Fi communication connection is released when the user terminal 40 is in a Wi-Fi communication-connected state based on the first AP information, it may be identified that the Wi-Fi communication connection of the plurality of devices 10, 20, 30 is released and the second AP information may be transmitted to the electronic apparatus 100. In this case, the user terminal 40 may identify a specific device of the plurality of devices 10, 20, 30 in which the communication connection is released as a specific device to transmit second AP information. For example, information about a specific device may be pre-stored in the electronic apparatus 100 based on a user command or a signal received from the server 50. For example, a specific device may be selected and stored through a menu provided in the IoT application.

The electronic apparatus 100 may perform communication connection with an AP device based on second AP information received from the user terminal 40 in operation S320. In an embodiment, when the first AP information is information corresponding to the AP device 60 illustrated in FIG. 1, the AP device may be the same AP device or a different AP device as the AP device 60 illustrated in FIG. 1. For example, when the second AP information is changed AP information of the AP device 60 illustrated in FIG. 1, the AP device may be the same AP device as the AP device 60 illustrated in FIG. 1. In an embodiment, when the second AP information is AP information of the new AP device, the AP device may be an AP device different from the AP device 60 illustrated in FIG. 1.

In an embodiment, the electronic apparatus 100 may operate in the AP mode based on the first AP information according to a following event.

In an embodiment of the disclosure, the user terminal 40 may transmit second AP information to the electronic apparatus 100, and request the electronic apparatus 100 to operate in an AP mode for transferring second AP information to second device 20. That is, the electronic apparatus 100 may operate in the AP mode based on the request signal received from the user terminal 40.

According to another embodiment, the user terminal 40 may request that a Wi-Fi update of second device 20 is required to the server 50, and the server 50 may request the second device 20 to operate in an AP mode for transferring second AP information to the second device 20. The electronic apparatus 100 is communicatively connected to the AP device based on the second AP information, and thus may communicate with the server 50. That is, the electronic apparatus 100 may operate in the AP mode based on the request signal received from the server 50.

According to another embodiment, the server 50 may request the electronic apparatus 100 to operate in an AP mode for transferring second AP information to second device 20. That is, since the server 50 stores the target device list and may communicate with the electronic apparatus 100 based on the second AP information, the server 50 may request the electronic apparatus 100 to operate in the AP mode for transferring the second AP information to the second device 20.

When the electronic apparatus 100 operates in the AP mode based on the first AP information, second device 20 may be communicatively connected to the electronic apparatus 100, since the second device 20 performs a scan operation for a Wi-Fi communication connection based on first AP information known by the device 20 when the Wi-Fi communication connection is released based on the first AP information. For example, the electronic apparatus 100 may broadcast a first SSID included in the first AP information, and the second device 20 may scan the first SSID and connect to the electronic apparatus 100 based on a password included in the first AP information, so that a device to device (D2D) communication channel may be formed between the electronic apparatus 100 and the second device 20.

When the electronic apparatus 100 and the second device 20 are communicatively connected in operation S340, the electronic apparatus 100 may transmit the second AP information to the second device 20 in operation S350.

In an embodiment, the electronic apparatus 100 may terminate the AP mode according to a preset event in operation S460.

The preset event may include at least one of an event in which a preset time has elapsed after the electronic apparatus 100 operating in the AP mode, an event in which a preset time has elapsed after transmitting the second AP information to the second device 20, an event in which the second AP information is transmitted to the entire target devices included in the target device list, or an event in which an end request of the AP mode is identified.

In an embodiment, when it is identified that a preset time has elapsed after operating in the AP mode, the electronic apparatus 100 may terminate the AP mode. Here, the preset time may be a time set when the electronic apparatus 100 is manufactured, or may be a time received from at least one of the user terminal 40 or the server 50.

In an embodiment, when the electronic apparatus 100 receives an AP mode request signal from at least one of the user terminal 40 or the server 50, information about preset time may be received together.

In an embodiment, when it is identified that a preset time has elapsed after transmitting the second AP information to the second device 20, the electronic apparatus 100 may terminate the AP mode. Here, the preset time may be a time set when manufacturing the electronic apparatus 100 or may be a time received from at least one of the user terminal 40 or the server 50. In an embodiment, when the electronic apparatus 100 receives an AP mode request signal from at least one of the user terminal 40 or the server 50, information on a preset time may be received together.

In an embodiment, if it is identified that the second AP information is transmitted to all the entire target devices included in the target device list, the electronic apparatus 100 may terminate the AP mode. Here, the target device list may be pre-stored in the memory 120 of the electronic apparatus 100 or may be received from the user terminal 40 or the server 50. When the target device list is pre-stored in the electronic apparatus 100, the electronic apparatus 100 may receive and store the target device list before the Wi-Fi communication connection with the server 50 based on the first AP information is released, or may be the case where the target device list is received and stored from the AP device (e.g., AP device 60, FIG. 1) communicatively connected based on the first AP information.

In an embodiment, when an end request of an AP mode is identified, the electronic apparatus 100 may terminate the AP mode. For example, for example, a specific button provided in the electronic apparatus 100 may be pressed, or a user command may be input through a menu displayed on a display of the electronic apparatus 100. However, the embodiment is not limited thereto, and an AP mode end request may be received based on various methods such as a remote control signal by a remote control, a remote control signal at a user terminal in which an application remotely controllable is being executed, a user voice command, a user gesture command, and user gaze recognition, or the like. Here, the user terminal may be the user terminal 40 of FIG. 1 or another user terminal. In an embodiment, the electronic apparatus 100 may receive an end request signal from the user terminal 40 through another communication method (e.g., Bluetooth) other than Wi-Fi communication.

In an embodiment, the second device 20 may be communicatively connected to the AP device based on the second AP information received from the electronic apparatus 100 in operation S450. For example, the second device 20, after communication connection with the server 50 is released in operation S410, may be communicatively connected to the server 50 again based on the second AP information.

In an embodiment, the second device 20 may update (or change) the stored first AP information to the second AP information or receive a command (or signal) for adding the second AP information as new AP information together with the second AP information. In this case, the second device 20 may update (or change) pre-stored first AP information to second AP information or add second AP information to new AP information (e.g., AP information having the highest priority during communication connection) based on a command (or signal) received together with second AP information.

In an embodiment, the second device 20 may update (or change) pre-stored first AP information to second AP information or add second AP information as new AP information when new AP information, that is, second AP information, is received from the electronic apparatus 100 while communicating with the electronic apparatus 100 in the AP mode based on the first AP information. That is, even if there is no separate command received together with the second AP information, the second device 20 may update (or change) the pre-stored first AP information to the second AP information or add the second AP information to the new AP information based on the reception of the new AP information even if there is no separate command received together with the second AP information.

Figure 5A:
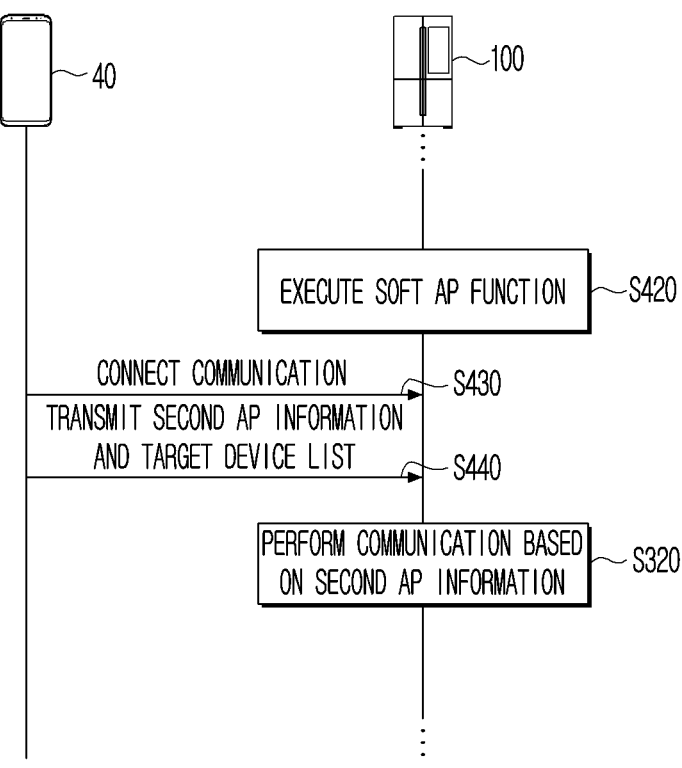
FIGS. 5A, 5B, and 5C are diagrams illustrating a method of obtaining a target device list by an electronic apparatus according to an embodiment.
Figure 5B:
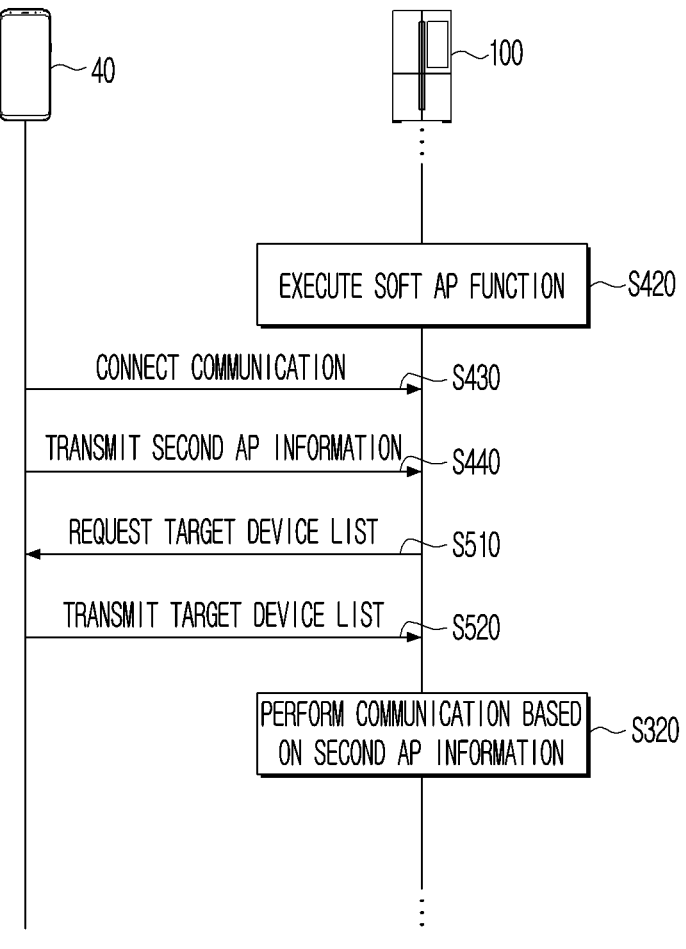
Figure 5C:
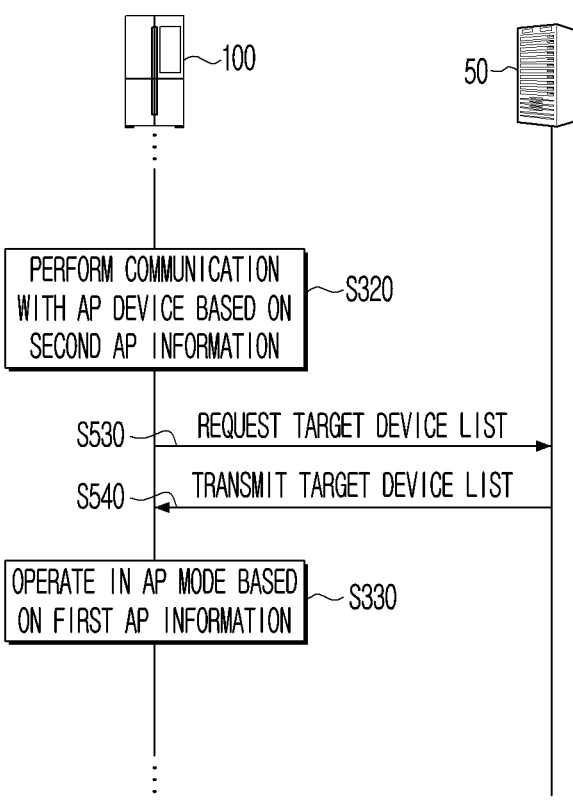

FIGS. 5A, 5B, and 5C are diagrams illustrating a method of obtaining a target device list by an electronic apparatus according to an embodiment.

Referring to FIG. 5A, if the electronic apparatus 100 executes the SoftAP function and operates in the AP mode, the user terminal 40 may be communicatively connected to the electronic apparatus 100 in operation S420.

When the user terminal 40 is communicatively connected to the electronic apparatus 100 in operation S430, the user terminal 40 may transmit not only the second AP information but also the target device list to the electronic apparatus 100 in operation S440, because the user terminal 40 may store a target device list through the IoT application described in FIG. 1, or may receive a target device list from the server 50.

In an embodiment, when the user terminal 40 is communicatively connected to the electronic apparatus 100 in operation S430, the second AP information and the target device list may be automatically transmitted. That is, even if there is no separate request from the electronic apparatus 100 after the user terminal 40 is communicatively connected to the electronic apparatus 100, the user terminal 40 may transmit the second AP information and the target device list to the electronic apparatus 100. For example, when it is necessary to transmit the second AP information to the electronic apparatus 100 according to the various examples described above, the user terminal 40 may identify that the target device list is required in the electronic apparatus 100. For example, when the second AP information is required to be transmitted to the electronic apparatus 100, the target device list may also be preset to be transmitted (e.g., a setting or a user command when manufacturing). In an embodiment, when the second AP information is transmitted to the electronic apparatus 100, a user command capable of transmitting the second AP information to the target device list may be received through a UI (e.g., a pop-up UI) provided by the IoT application. In an embodiment, the second AP information and the target device list may be transmitted to the electronic apparatus 100 by receiving, from the server 50, a signal to transmit the target device list as well when the second AP information is transmitted to the electronic apparatus 100.

In an embodiment, the user terminal 40 simultaneously transmits the second AP information and the target device list to the electronic apparatus 100 (e.g., one signal or a sequential signal without an intermediate intervention signal or another signal), but is not necessarily limited thereto. For example, the user terminal 40 may transmit a signal that a Wi-Fi update of second device 20 is required and a target device list after transmitting the second AP information to the electronic apparatus 100. In this case, a signal indicating that Wi-Fi update of second device 20 is required and the target device list may be transmitted simultaneously (that is, through one signal) or a signal indicating that Wi-Fi update of second device 20 is necessary may be transmitted first, and then a target device list may be transmitted.

In an embodiment, after the user terminal 40 is communicatively connected to the electronic apparatus 100, when the user terminal 40 receives a request for new AP information and the target device list from the electronic apparatus 100, the corresponding information may be transmitted.

Thereafter, the electronic apparatus 100 may be communicatively connected to the AP device based on the second AP information in operation S320.

Referring to FIG. 5B, if the electronic apparatus 100 operates in the AP mode by executing the SoftAP function in operation S420, the user terminal; 40 may be communicatively connected to the electronic apparatus 100 in operation S430.

When the user terminal 40 is communicatively connected to the electronic apparatus 100 in operation S430, the user terminal 40 may transmit second AP information to the electronic apparatus 100 in operation S440. In an embodiment, when the user terminal 40 is communicatively connected to the electronic apparatus 100, a function of transmitting only the second AP information may be implemented. That is, even if there is no separate request from the electronic apparatus 100 after the user terminal 40 is communicatively connected to the electronic apparatus 100, the user terminal 40 may transmit the second AP information to the electronic apparatus 100. In an embodiment, if the user terminal 40 is communicatively connected to the electronic apparatus 100, request of the second AP information may be received from the electronic apparatus 100 and the second AP information may be transmitted to the electronic apparatus 100 in response thereto.

In an embodiment, the electronic apparatus 100 may request a target device list to the user terminal 40 in operation S510. That is, after receiving the second AP information, the electronic apparatus 100 may request the user terminal 40 for a list including information of the target devices to which the second AP information is to be transmitted. The user terminal 40 may transmit the target device list to the electronic apparatus 100 in response to a request from the electronic apparatus 100 in operation S520. According to another embodiment, the electronic apparatus 100 may transmit a signal inquiring whether other devices need to update Wi-Fi to the user terminal 40, and the user terminal 40 may include a target device list in a response signal indicating that Wi-Fi update of other devices is necessary, and transmits the response signal to the electronic apparatus 100. However, the embodiment is not limited thereto, and the form of a request signal for receiving the target device list from the user terminal 40 may be diverse.

Thereafter, the electronic apparatus 100 may communicatively connect with the AP device based on the second AP information in operation S320.

Referring to FIG. 5C, when the electronic apparatus 100 normally communicates with an AP device based on second AP information in operation S320, the electronic apparatus 100 may communicate with the server 50.

In an embodiment, the electronic apparatus 100 may request a target device list to the server 50 in operation S530. In this case, the server 50 may transmit the target device list to the electronic apparatus 100 in response to the request in operation S540.

Thereafter, the electronic apparatus 100 may operate in the AP mode based on the first AP information to transmit the second AP information to the devices included in the target device list in operation S330.

In an embodiment, even if the electronic apparatus 100 does not request the target device list to the server 50, the server 50 may transmit the target device list to the electronic apparatus 100. For example, the user terminal 40 may transmit, to the server 50, a signal indicating that the second AP information is transmitted to the electronic apparatus 100, and the server 50 may transmit the target device list to the electronic apparatus 100 based on the corresponding signal. In an embodiment, since the server 50 is capable of communicating with the IoT application, it is possible to identify that the Wi-Fi update of the second device 20 is necessary and transmit the target device list to the electronic apparatus 100. In an embodiment, when the electronic apparatus 100 is communicatively connected to the server 50 based on the second AP information, the electronic apparatus 100 may identify that the Wi-Fi update of the second device 20 is necessary and transmit the target device list to the electronic apparatus 100.

Figure 6A:
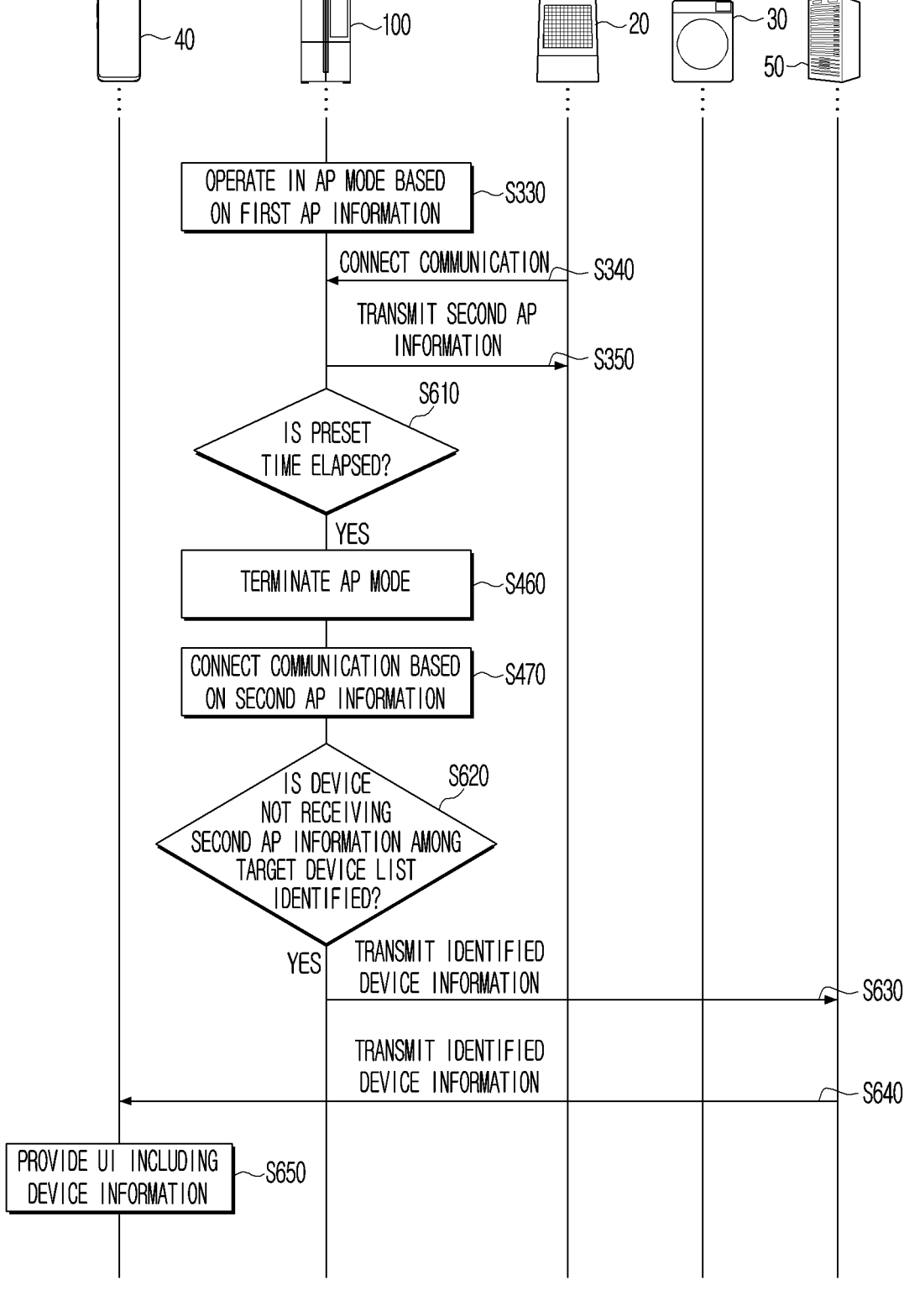
FIGS. 6A and 6B are diagrams illustrating a method of terminating an AP mode by an electronic apparatus according to an embodiment.
Figure 6B:
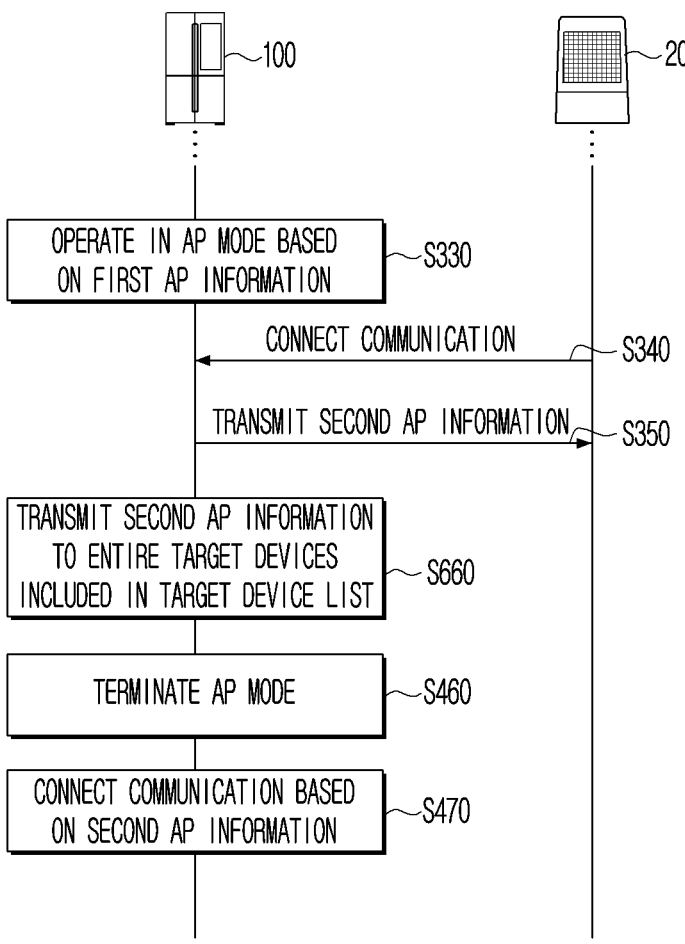

FIGS. 6A and 6B are diagrams illustrating a method of terminating an AP mode by an electronic apparatus according to an embodiment.

FIG. 6A is a diagram illustrating an embodiment in which the AP mode is terminated after a preset time has passed by the electronic apparatus 100.

Referring to FIG. 6A, the electronic apparatus 100 may operate in an AP mode based on the first AP information according to a preset event in operation S330. Since an event in which the electronic apparatus 100 operates in the AP mode is described in detail with reference to FIG. 3, a further description thereof will be omitted.

When the electronic apparatus 100 operates in the AP mode based on the first AP information, the second device 20 may be communicatively connected to the electronic apparatus 100.

When the electronic apparatus 100 and the second device 20 are communicatively connected in operation S340, the electronic apparatus 100 may transmit the second AP information to the second device 20 in operation S350.

The electronic apparatus 100 may terminate the AP mode according to a preset event in operation S460. The preset event may include at least one of an event in which a preset time has elapsed after the electronic apparatus 100 operates in the AP mode, an event in which a preset time has elapsed after transmitting the second AP information to the second device 20, an event in which the second AP information is transmitted to the entire target devices included in the target device list, or an event in which an end request of the AP mode is identified. Since a detailed example of these events is duplicated with the contents described in FIG. 3, additional description will be omitted.

Then, the electronic apparatus 100 may be communicatively connected to the AP device based on the second AP information in operation S470.

The electronic apparatus 100 may identify whether there is a device which has not received the second AP information from the target device list after the AP mode ends in operation S620. After the electronic apparatus 100 operates in the AP mode and then ends the AP mode after a predetermined time has elapsed, some of the target devices included in the target device list may not receive the second AP information. For example, in various cases such as a case where there is an error in a Wi-Fi module of a specific device, power is turned off, there is an error in a communication channel, or the like, some devices may not receive second AP information. When a communication channel with a specific device is not formed, if an error is identified in the corresponding communication channel, a response signal is not received from a specific device, and so on, the electronic apparatus 100 may identify that a specific device has failed to receive second AP information. However, the operation S620 may be performed before the operation S470.

In operation S630, the electronic apparatus 100 may transmit information about the identified device to the server 50 when it is identified that a specific device (e.g., the device 30) among the target devices included in the target device list does not receive the AP information in operation S620: YES. The electronic apparatus 100 may communicate with the server 50 because the electronic apparatus 100 is communicatively connected to the AP apparatus based on the second AP information.

The server 50 may transmit the device information received from the electronic apparatus 100 to the user terminal 40. In this case, the user terminal 40 may provide a UI including device information received from the server 50 in operation S650. Accordingly, the user may identify the device to which the Wi-Fi communication is not connected, based on the second AP information among the devices included in the target device list. In this case, the user may perform follow-up measures for the corresponding device. For example, the user may execute the SoftAP function at the corresponding device to allow the corresponding device to receive second AP information from the user terminal 40 or directly input second AP information to the corresponding device.

FIG. 6B is a diagram illustrating an embodiment in which the electronic apparatus terminates the AP mode based on the target device list.

Referring to FIG. 6B, when the electronic apparatus 100 is communicatively connected to an AP device based on the second AP information, the electronic apparatus 100 may operate in an AP mode based on the first AP information in operation S330. When the electronic apparatus 100 operates in the AP mode based on the first AP information, the second device 20 may be communicatively connected to the electronic apparatus 100 in operation S340.

When the electronic apparatus 100 and the second device 20 are communicatively connected in operation S340, the electronic apparatus 100 may transmit the second AP information to the second device 20 in operation S350.

The electronic apparatus 100 may identify whether second AP information is transmitted to all of target devices included in a target device list in operation S660. For example, when a response signal is received from the corresponding device 20 after transmitting the second AP information to the second device 20, the electronic apparatus 100 may identify that the second AP information is transmitted. Here, as described above, the target device list may be pre-stored in the electronic apparatus 100 or may be received from the user terminal 40 or the server 50.

When it is identified that the second AP information is transmitted to all the target devices included in the target device list in operation S660, the electronic apparatus 100 may terminate the AP mode in operation S460.

Thereafter, the electronic apparatus 100 may perform communication connection with the AP device based on the second AP information in operation S470.

Figure 7:
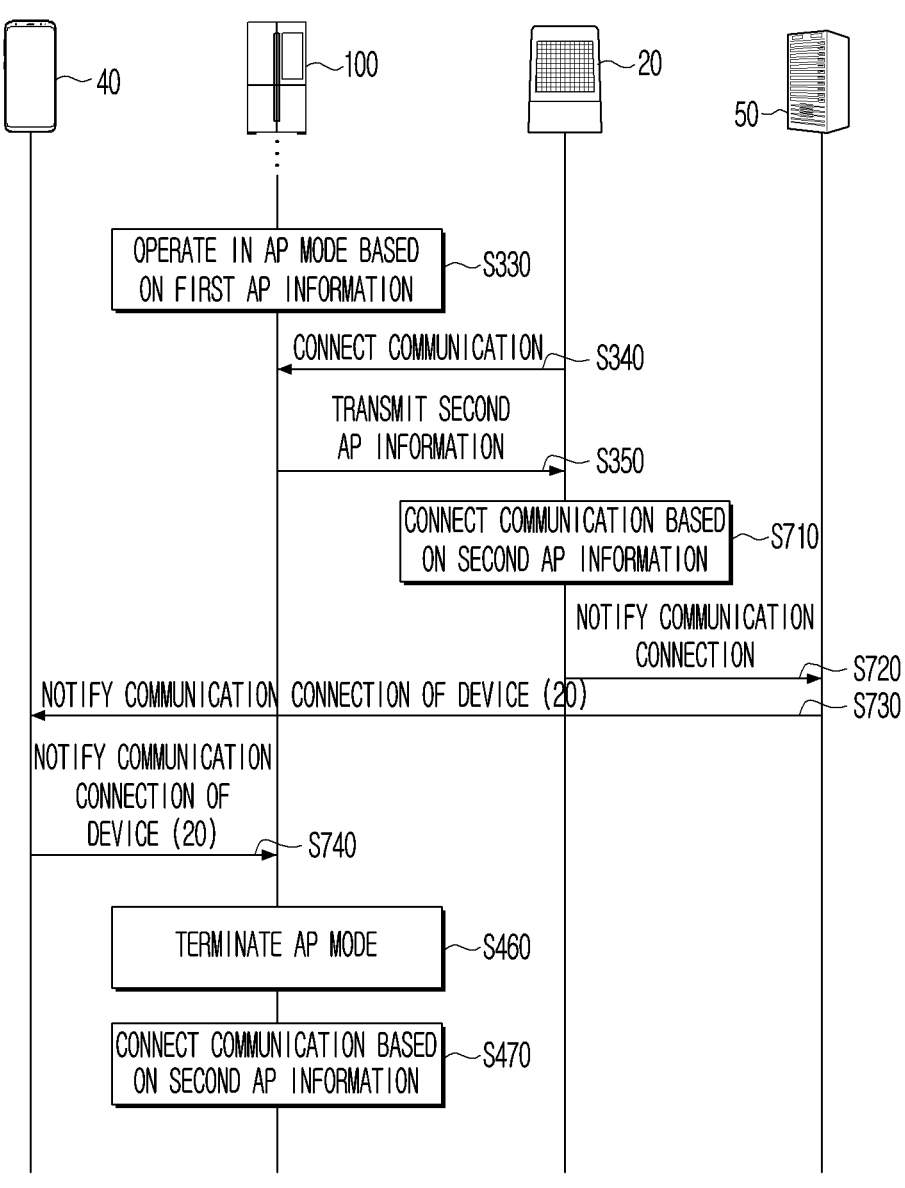
FIG. 7 is a diagram illustrating a method of terminating an AP mode by an electronic apparatus according to an embodiment.

FIG. 7 is a diagram illustrating a method of terminating an AP mode by an electronic apparatus according to an embodiment.

Referring to FIG. 7, when the electronic apparatus 100 is communicatively connected to an AP device based on the second AP information, the electronic apparatus 100 may operate in an AP mode based on the first AP information in operation S330. When the electronic apparatus 100 operates in the AP mode based on the first AP information, second device 20 may be communicatively connected to the electronic apparatus 100.

When the electronic apparatus 100 and the second device 20 are communicatively connected in operation S340, the electronic apparatus 100 may transmit the second AP information to the second device 20 in operation S350.

The second device 20 may perform communication connection based on the second AP information received from the electronic apparatus 100 in operation S710. That is, the second device 20 enables Wi-Fi communication with an AP device based on the second AP information, and thus may communicate with the server 50.

The second device 20 may transmit, to the server 50, a signal that Wi-Fi communication connection is made based on the second AP information in operation S720.

When a signal is received from second device 20, the server 50 may transmit a signal notifying communication connection of the second device 20 to the user terminal 40 in operation S730. For example, the server 50 may transmit, to the user terminal 40, the signal through a mobile communication network such as LTE, 5G, or Wi-Fi communication (e.g., when the user terminal 40 is capable of Wi-Fi communication with the server 50).

When a signal is received from the server 50, the user terminal 40 may transmit a signal notifying a communication connection of second device 20 to the electronic apparatus 100 in operation S740. In this case, the user terminal 40 may transmit, to the electronic apparatus 100, a signal indicating a communication connection of second device 20 through a communication method other than a Wi-Fi communication method, but may transmit, to the electronic apparatus 100, a signal notifying a communication connection of second device 20 in a Wi-Fi communication method.

In an embodiment, when the electronic apparatus 100 supports a single Wi-Fi communication channel, the user terminal 40 may transmit, to the electronic apparatus 100, a signal indicating a communication connection of second device 20 through another communication method other than a Wi-Fi communication method, since the AP mode between the user terminal 40 and the electronic apparatus 100 is terminated, the Wi-Fi communication is impossible. For example, when the electronic apparatus 100 and the user terminal 40 support at least one of Bluetooth communication or NFC communication, the user terminal 40 may transmit a signal notifying a communication connection of second device 20 to the electronic apparatus 100 through the corresponding communication. In an embodiment, when the electronic apparatus 100 supports a plurality of Wi-Fi communication channels, the user terminal 40 may transmit, to the electronic apparatus 100, a signal indicating a communication connection of second device 20 in a Wi-Fi communication method. For example, the user terminal 40 may be in a state of maintaining communication with the electronic apparatus 100 through any one of a plurality of Wi-Fi communication channels (e.g., maintain a communication connection of operation S430 described in FIG. 4), and performing communication connection (e.g., S340) with second device 20 through the other one of the plurality of Wi-Fi communication channels. However, even when the electronic apparatus 100 supports a plurality of Wi-Fi communication channels, a signal notifying communication connection of second device 20 may be transmitted to the electronic apparatus 100 through another communication method other than Wi-Fi communication. When a signal notifying communication connection of second device 20 is received from the user terminal 40, the electronic apparatus 100 may terminate the AP mode in operation S460.

Thereafter, the electronic apparatus 100 may be communicatively connected to the AP device based on the second AP information in operation S470.

Figure 8:
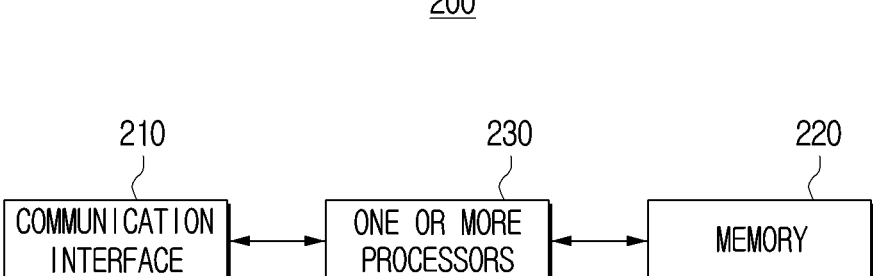
FIG. 8 is a block diagram illustrating a configuration of an electronic apparatus according to an embodiment.

FIG. 8 is a block diagram illustrating a configuration of an electronic apparatus according to an embodiment.

Referring to FIG. 8, the electronic apparatus 200 includes the communication interface 210, the memory 220, and one or more processors 330.

In an embodiment, the electronic apparatus 200 may be implemented as the user terminal 40 illustrated in FIG. 1. For example, the electronic apparatus 200 may be implemented as various devices such as a smartphone, a mobile phone, a tablet, a laptop, and the like. However, for convenience of description, it is assumed that the electronic apparatus 200 is implemented as a smartphone.

The electronic apparatus 200 may execute the IoT application and may provide various information and screens related to the IoT application. The IoT application may be an application for registering and managing a plurality of devices 10, 20, 30 in the server 50. In this case, the user may log in the server 50 through the inputted user account by executing the IoT application and inputting the user account in the electronic apparatus 200, and the electronic apparatus 200 may communicate with the server 50 based on the logged-in user account. The electronic apparatus 200 may access the server 50 through a mobile communication network such as LTE, 5G, or the like, or may access the server 50 through the AP device 60.

The implementation format of a communication interface 210, a memory 220, and one or more processors 330 are the same/similar to the communication interface 110, the memory 120, and one or more processors 230, and a duplicate description will be omitted.

In an embodiment, the memory 220 may store IoT application and information related thereto as described in FIG. 1.

For example, the memory 220 may store first AP information. In addition, the memory 120 may store second AP information. Here, the second AP information may be information different from the first AP information. For example, at least one of an SSID or a password included in the second AP information may be different from at least one of an SSID or a password included in the first AP information.

For example, the memory 220 may store a target device list. The target device list may include information about devices registered through the IoT application. Here, the information on the devices may include identification information, and the identification information may be in various forms such as, for example, a name, a model, a device token, and the like. In an embodiment, the list of target devices may include devices registered in an IoT application through the easy setup technology described in FIG. 1, but is not necessarily limited thereto. For example, the target device list may include information of devices communicatively connected to the first AP information. In an embodiment, the target device list may include the IoT devices registered in the same user account among target devices (that is, devices located in a specific space) communicatively connected based on the first AP information. In an embodiment, the target device list may be directly obtained by the electronic apparatus 200 through the Easy Setup technology or received from the server 50. In an embodiment, the list may be received from the AP device (60, FIG. 1) corresponding to the first AP information.

In an embodiment, the Wi-Fi communication connection of the plurality of devices 10, 20, 30 may be released when the first AP information is updated with the second AP information in a state where the plurality of devices 10, 20, 30 are capable of Wi-Fi communication based on the first AP information. For example, when the SSID and password of the AP device are changed for security, etc., if the AP device is changed to another AP device (reason such as taking back by a communication company), and the SSID and password of the other AP device should be reset, the communication connection of the devices performing the Wi-Fi communication may be released based on the first AP information, which is the AP information before the AP device needs to be reset. In this case, in order to transmit the second AP information to the plurality of devices 10, 20, the one or more processors 230 (hereinafter, may be referred to as a processor 230) may control the communication interface 210 to operate in the AP mode. Here, the communication interface 210 may include a Wi-Fi communication module.

Figure 9:
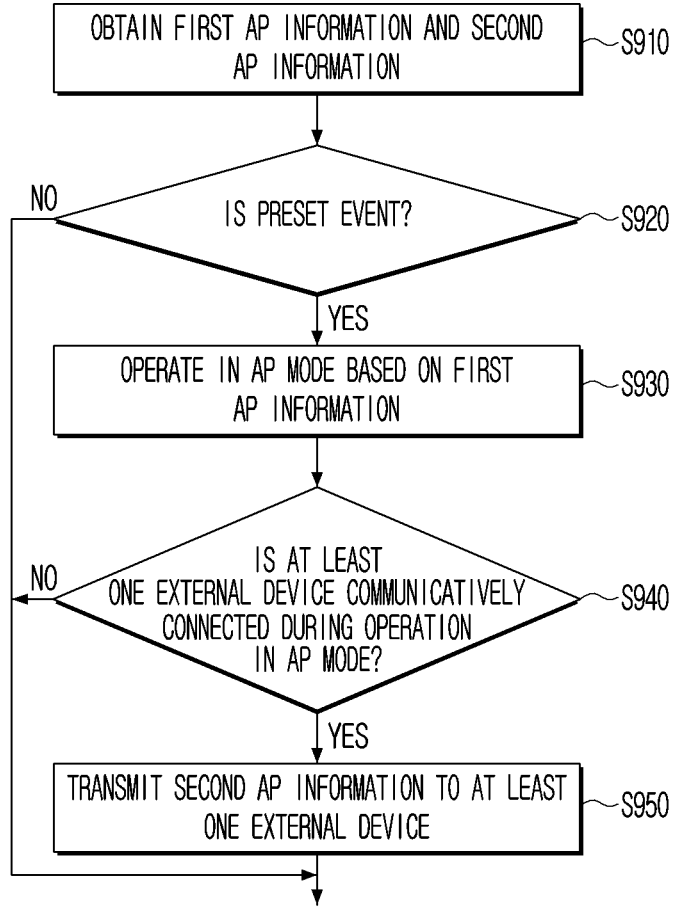
FIG. 9 is a diagram illustrating a communication method of an electronic apparatus according to an embodiment.

FIG. 9 is a diagram illustrating a communication method of an electronic apparatus according to an embodiment.

Referring to FIG. 9, the processor 230 may obtain the first AP information and the second AP information in operation S910.

In an embodiment, the processor 230 may obtain first AP information through a user input or receive first AP information from the server 50. For example, since the procedure in which the electronic apparatus 200 registers the plurality of devices 10, 20, 30 in the server 50 through the easy setup technology based on the first AP information has been performed, the electronic apparatus 200 may obtain the first AP information in the corresponding process.

In an embodiment, the first AP information may be received from the server 50 communicatively connected to the plurality of devices 10, 20, 30 based on the first AP information.

In an embodiment, the processor 230 may obtain second AP information through a user input or receive second AP information from the server 50. For example, the user may scan the SSID of the second AP information by using the electronic apparatus 200, and the second AP information may be pre-stored in the user terminal 40 by inputting a password the user knows. In an embodiment, the user may input both the SSID and password of the second AP information to the electronic apparatus 200. In an embodiment, the server 50 may know the second AP information, and the electronic apparatus 200 may receive the second AP information from the server 50. The obtained second AP information may be stored in the memory 220.

In operation S930, the processor 230 may control the communication interface (210) to operate in the AP mode based on the first AP information when a preset event is identified in operation S920: YES. Here, the preset event may include at least one of an event in which a communication connection based on the first AP information is identified as being released from at least one external device or an event in which a user command is identified. The user command may be a command for allowing the electronic apparatus 200 to operate in the AP mode based on the first AP information. For example, the user command may be a command for transmitting the second AP information to external devices so that external devices performing a communication connection based on the first AP information change the first AP information to the second AP information and perform communication connection. The processor 230 may operate in the AP mode based on the first AP information in order to transmit the second AP information to external devices. In an embodiment, the processor 230 may control the communication interface 210 to operate in the AP mode after confirming that the second AP information is valid AP information capable of communication connection, but does not necessarily require the corresponding operation.

Then, if at least one external device is communicatively connected through the communication interface 210 while operating in the AP mode based on the first AP information, the processor 230 may transmit the second AP information to at least one external device connected to the communication interface 210 in operation S950.

Figure 10:
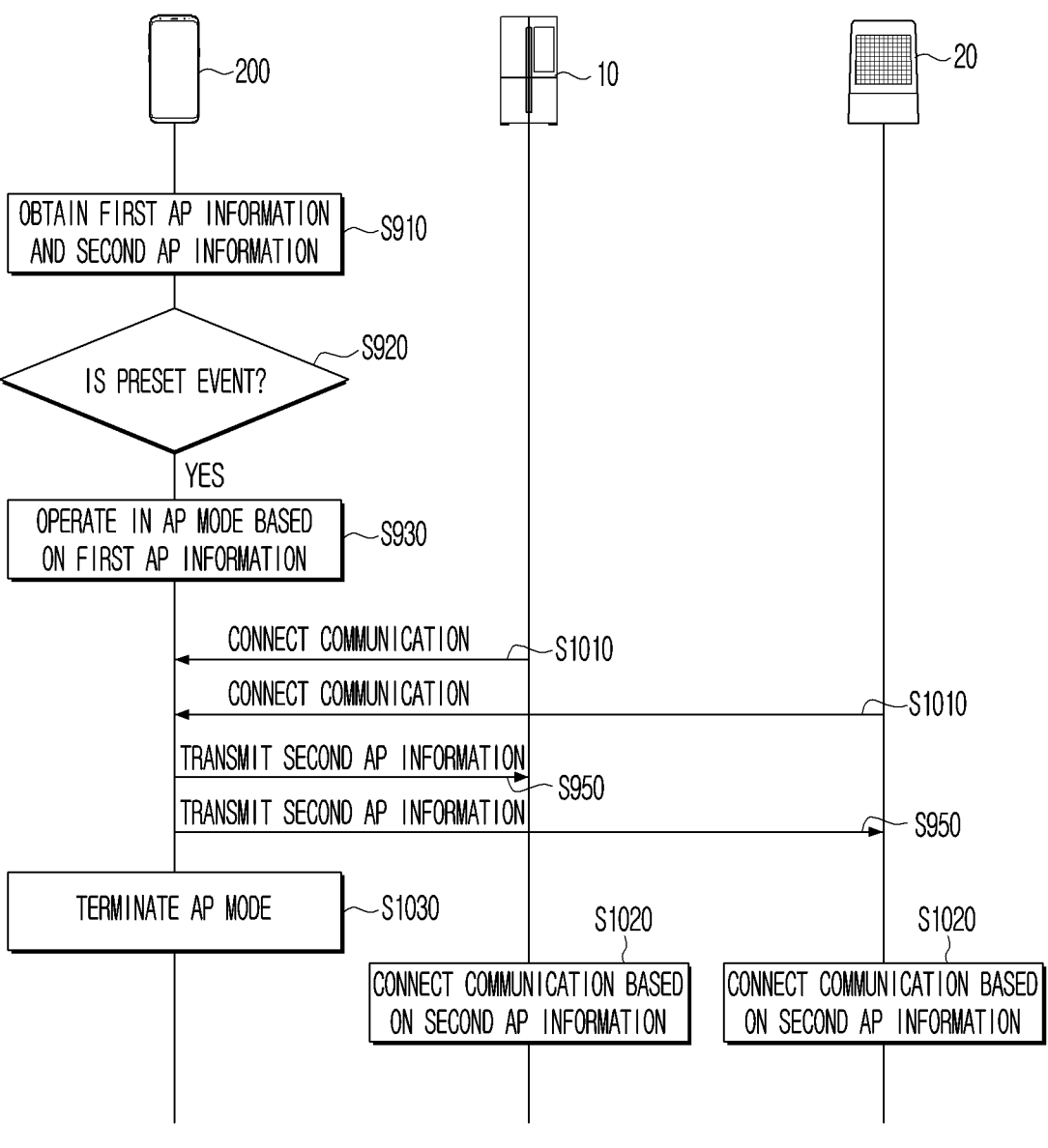
FIG. 10 is a sequence diagram specifically illustrating a communication method of an electronic apparatus according to an embodiment.

FIG. 10 is a sequence diagram specifically illustrating a communication method of an electronic apparatus according to an embodiment.

Referring to FIG. 10, the electronic apparatus 200 may obtain the first AP information and the second AP information in operation S910.

Then, when a preset event is identified in operation S920: YES, the electronic apparatus 200 may operate in the AP mode based on the first AP information in operation S930. That is, the electronic apparatus 200 may operate in the AP mode in order to transmit the updated AP information, that is, the second AP information to the plurality of devices 10, 20, 30. For example, the electronic apparatus 200 may operate in an AP mode according to a preset event.

In an embodiment, when it is identified that the Wi-Fi communication connection of the plurality of devices 10, 20, 30 registered in the application is released, the electronic apparatus 200 may operate in the AP mode based on the first AP information. For example, the electronic apparatus 200 may recognize that a Wi-Fi communication connection of a plurality of devices 10, 20, 30 has been released through an application and operate in an AP mode. In an embodiment, when a signal notifying that the Wi-Fi communication connection of the plurality of devices 10, 20, 30 has been released is received from the server 50, the electronic apparatus 200 may operate in the AP mode based on the first AP information.

In an embodiment, the electronic apparatus 200 may operate in an AP mode based on first AP information according to a user command. For example, the communication interface 210 may control the communication interface 210 to operate in the AP mode based on the first AP information by executing the SoftAP function provided in the electronic apparatus 200.

In an embodiment, when the communication interface 210 is in a Wi-Fi communication-connected state based on the first AP information, the electronic apparatus 200 may identify that the Wi-Fi communication connection through the communication interface 210 is released, identify that the Wi-Fi communication connection of the plurality of devices 10, 20, 30 has been released, and operate in the AP mode based on the first AP information.

For example, after identifying that the second AP information is AP information capable of communication, the electronic apparatus 200 may operate in the AP mode based on the first AP information, but the operation is not necessarily limited thereto.

The plurality of devices 10, 20, 30 may be communicatively connected to the electronic apparatus 200 when the electronic apparatus 200 operates in the AP mode based on the first AP information in operation S1010. This is because when the Wi-Fi communication connection is released based on the first AP information, the plurality of devices 10, 20, 30 perform a scan operation for a Wi-Fi communication connection based on the first AP information known by the plurality of devices 10, 20, 30. For example, the electronic apparatus 200 may broadcast a first SSID included in the first AP information, and the plurality of devices 10, 20, 30 may scan the first SSID and connects to the electronic apparatus 200 based on a password included in the first AP information, so that a device to device (D2D) communication channel may be formed between the electronic apparatus 200 and the plurality of devices 10, 20, 30.

When a plurality of devices 10, 20, 30 are communicatively connected to the electronic apparatus 200 in operation S1010, the electronic apparatus 200 may transmit updated AP information, that is, second AP information to the plurality of devices 10, 20, 30 in operation S950. For example, the electronic apparatus 200 may transmit second AP information to the electronic apparatus 100 through a D2D channel.

The electronic apparatus 200 may terminate the AP mode according to a preset event in operation S1030. For example, the electronic apparatus 200 may terminate the AP mode according to a following preset event.

In an embodiment, when it is identified that a preset time has elapsed after operating in the AP mode, the electronic apparatus 200 may terminate the AP mode. Here, the preset time may be a time set when manufacturing the electronic apparatus 200 or a time received from the server 50. In an embodiment, when the electronic apparatus 200 receives an AP mode request signal from the server 50, information on a preset time may be received together. In an embodiment, if it is identified that a preset time has elapsed after transmitting the second AP information to the plurality of devices 10, 20, the electronic apparatus 200 may terminate the AP mode. Here, the preset time may be a time set when manufacturing the electronic apparatus 200 or a time received from the server 50. In an embodiment, when an electronic apparatus 200 receives an AP mode request signal from the server 50, information on a preset time may be received together.

In an embodiment, if it is identified that the second AP information is transmitted to the entire target devices included in the target device list, the electronic apparatus 200 may terminate the AP mode. Here, the target device list may be pre-stored in the memory 220 of the electronic apparatus 200 or may be received from the server 50. For example, the target device list may be obtained in the same manner as described with reference to FIG. 8.

In an embodiment, the plurality of devices 10, 20, 30 may communicate with an AP device based on second AP information received from the electronic apparatus 200 in operation S1020. For example, when the communication connection with the server 50 is released by changing the AP information, the plurality of devices 10 and 20 may communicate with the server 50 again based on the newly obtained second AP information.

Figure 11A:
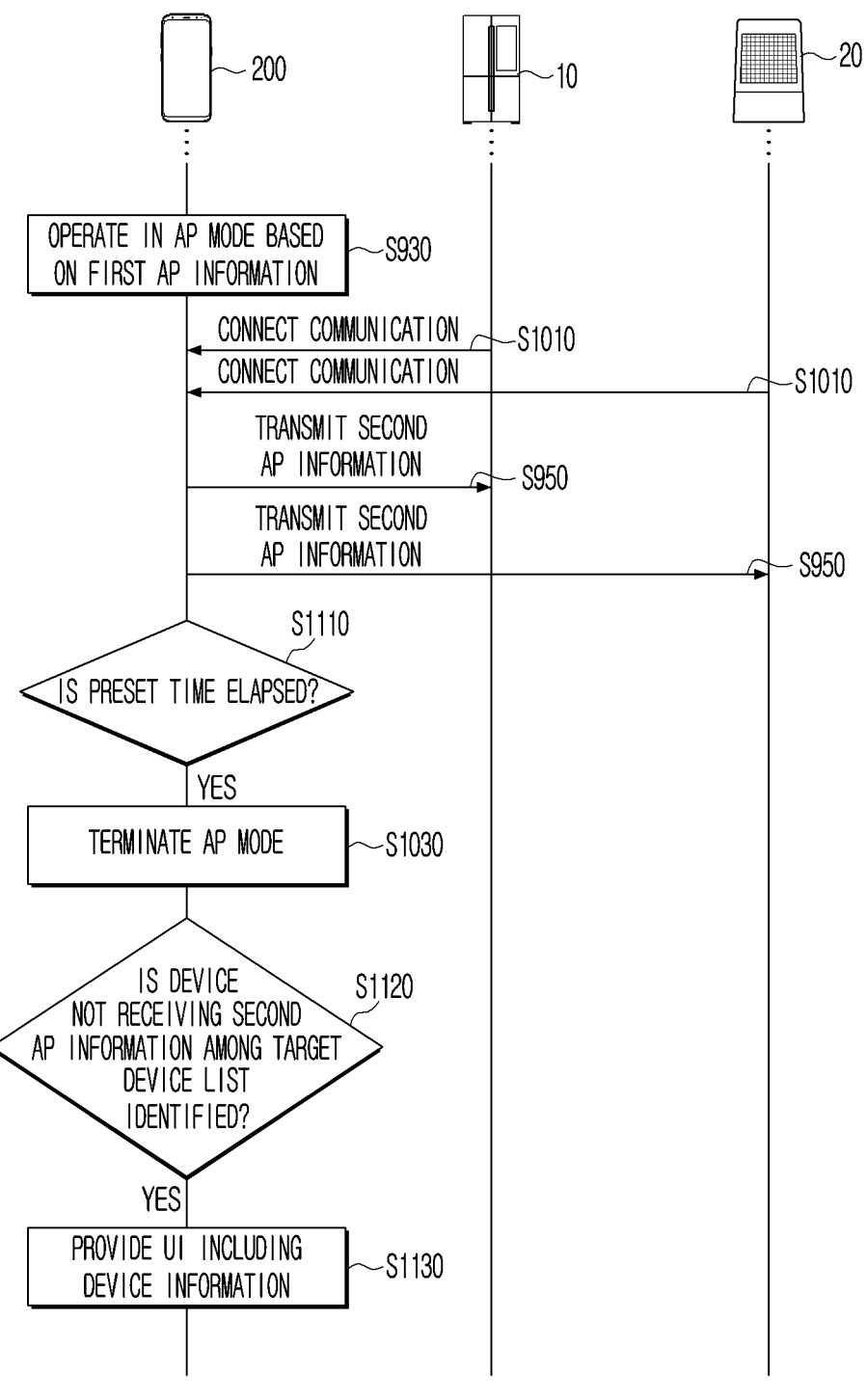
FIGS. 11A and 11B are diagrams illustrating a method of terminating an AP mode by an electronic apparatus according to an embodiment.
Figure 11B:
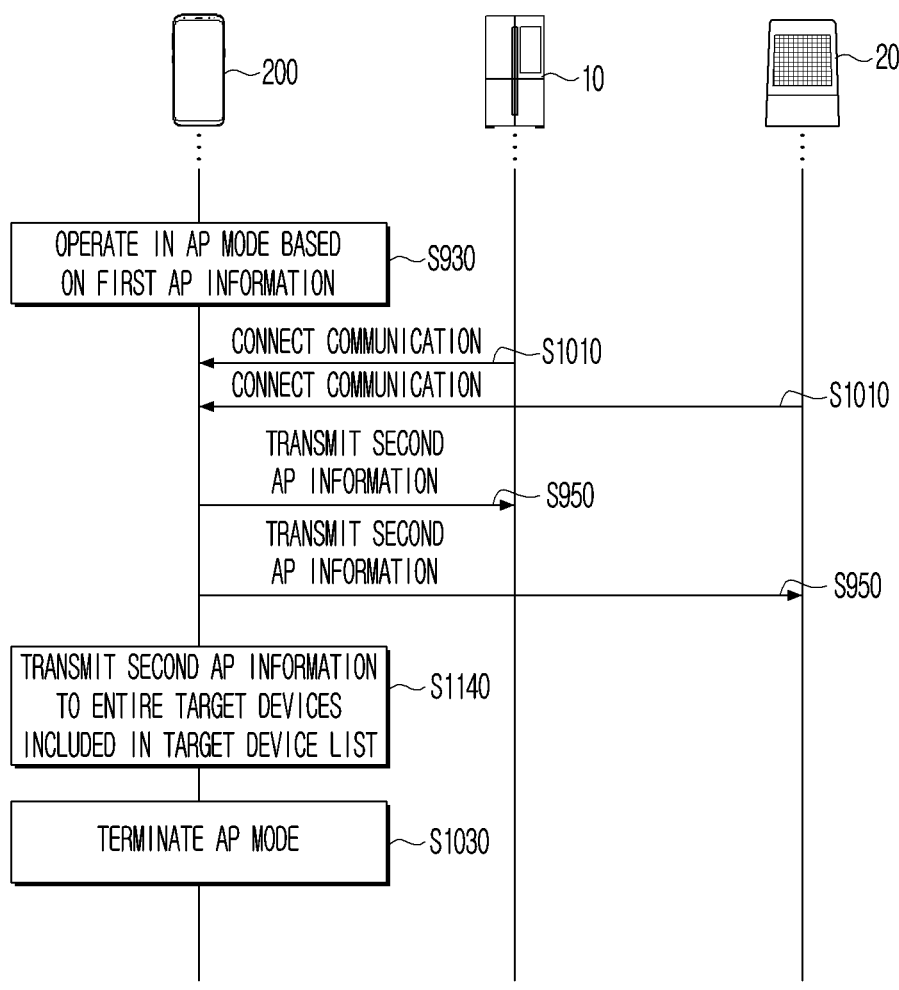

FIGS. 11A and 11B are diagrams illustrating a method of terminating an AP mode by an electronic apparatus according to an embodiment.

FIG. 11A is a diagram illustrating an embodiment of terminating the AP mode after a preset time has passed by the electronic apparatus 200.

Referring to FIG. 11A, it is possible to operate in an AP mode based on the first AP information in operation S930. When the electronic apparatus 200 operates in the AP mode based on the first AP information, the plurality of devices 10, 20, 30 may be communicatively connected to the electronic apparatus 100 in operation S1010.

When the electronic apparatus 200 and a plurality of devices 10, 20, 30 are communicatively connected in operation S1010, the electronic apparatus 200 may transmit the second AP information to the plurality of devices 10, 20, 30 in operation S950.

The electronic apparatus 200 operates in the AP mode and then, when it is identified that a preset time has elapsed in operation S1110: YES, the electronic apparatus 200 may terminate the AP mode in operation S1030. In an embodiment, if it is identified that a preset time has elapsed after transmitting the second AP information to the plurality of devices 10, 20, the electronic apparatus 200 may terminate the AP mode in operation S1030.

In an embodiment, the electronic apparatus 200 may identify whether there is a device which has not received the second AP information from the target device list after the AP mode ends in operation S1120. Since the AP mode is terminated after a preset time elapses after the electronic apparatus 200 operates in the AP mode or transmits the second AP information, some of the target devices included in the target device list may not receive the second AP information. For example, in various cases such as if there was an error in a Wi-Fi module of a specific device, if power is turned off, or if there is an error in a communication channel, etc., some devices may not receive second AP information. The electronic apparatus 100 may identify that a specific device does not receive second AP information based on an example in which a communication channel with a specific device is not formed, an error in the corresponding communication channel is identified, a response signal is not received from a specific device, and the like. However, it is apparent that the operation S1120 may be performed before the operation S1110.

If it is identified that a specific device among the target devices included in the target device list does not receive AP information in operation S1120: YES, the electronic apparatus 200 may provide a UI including the identified device information in operation S1130. Accordingly, the user may identify a device to which the Wi-Fi communication is not connected, based on updated AP information among the devices included in the target device list. In this case, the user may perform follow-up measures for the corresponding device.

FIG. 11B is a diagram illustrating an embodiment in which the AP mode is terminated by the electronic apparatus 200 based on the target device list.

Referring to FIG. 11B, the electronic apparatus 200 may operate in an AP mode based on the first AP information in operation S930. If the electronic apparatus 200 operates in the AP mode based on the first AP information, the plurality of devices 10, 20, 30 may be communicatively connected to the electronic apparatus 200 in operation S1010.

When the electronic apparatus 200 and the plurality of devices 10, 20, 30 are communicatively connected in operation S1010, the electronic apparatus 200 may transmit second AP information to the plurality of devices 10, 20, 30 in operation S950.

The electronic apparatus 200 may identify whether second AP information is transmitted to all of target devices included in a target device list in operation S1140. For example, when a response signal is received from the corresponding device 10, 20 after transmitting the second AP information to the plurality of devices 10, 20, the electronic apparatus 200 may identify that the second AP information is transmitted or that the corresponding device 10, 20 has received the second AP information.

In operation S1030, the electronic apparatus 200 may terminate the AP mode when it is identified that second AP information is transmitted to the entire target devices included in the target device list in operation S1140.

FIGS. 12A and 12B are diagrams illustrating various types of information according to an embodiment.

Referring to FIG. 12A, a plurality of devices 10, 20, 30 may store identification information of a pre-connected AP device and device identification information (e.g., a media access control (MAC) address, a device token, etc.) used to connect to the AP device. For example, the SSID 1 and password may correspond to the first AP information.

Referring to FIG. 12B, when a plurality of devices 10, 20, 30 receive the second AP information and are connected to an AP device (not shown), the second AP information may be updated in the plurality of devices 10, 20, 30. For example, SSID 2 and password stored in the plurality of devices 10, 20, 30 may correspond to second AP information.

Figure 13:
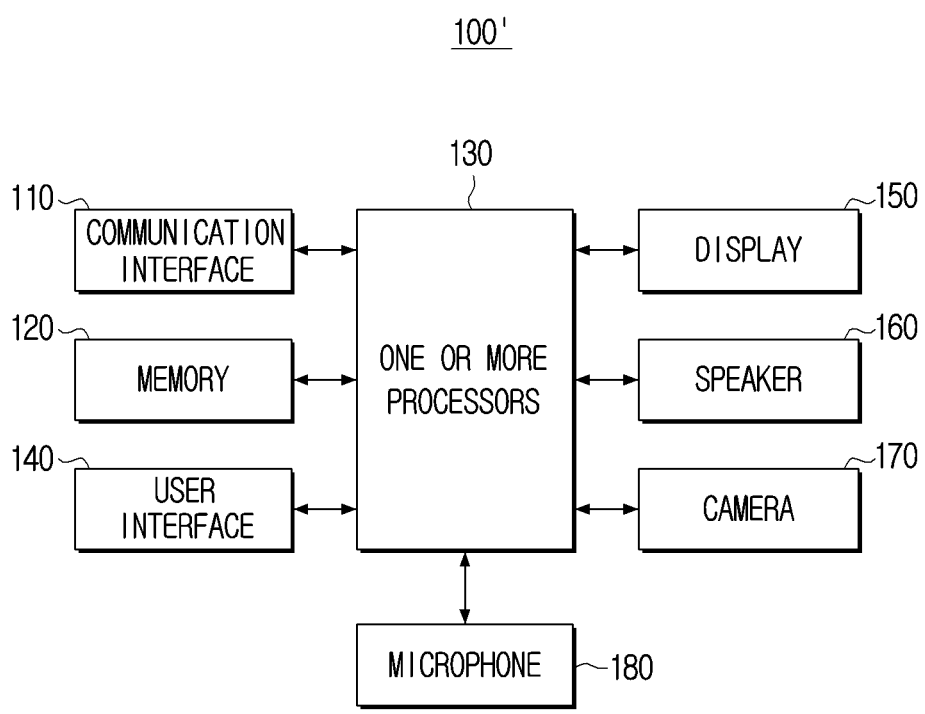
FIG. 13 is a block diagram illustrating an example of an electronic apparatus according to an embodiment.

FIG. 13 is a block diagram illustrating an example of an electronic apparatus according to an embodiment.

Referring to FIG. 13, the electronic apparatus 100' may include the communication interface 110, the memory 120, one or more processors 130, a user interface 140, a display 150, a speaker 160, a camera 170, and a microphone 180. In the configuration illustrated in FIG. 12, a detailed description of a configuration overlapping with the configuration shown in FIG. 2 is omitted.

The user interface 140 may be implemented as a device such as, for example, a button, a touch pad, a mouse, and a keyboard, or a touch screen capable of performing the above-described display function and operation input function, or the like. According to an embodiment, the user interface 140 may be implemented as a remote control transceiver and may receive a remote control signal. The remote control transceiver may receive a remote control signal from an external remote controller through at least one communication methods such as an infrared rays communication, Bluetooth communication, or Wi-Fi communication, or transmit the remote control signal.

The display 150 may be implemented as a display including a self-emitting element or a display including a non-self-limiting element and a backlight. For example, the display 150 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 150, a backlight unit, a driving circuit which may be implemented as an a-si TFT, low temperature poly silicon (LTPS) TFT, organic TFT (OTFT), or the like, may be included as well. The display 150 may be implemented as a touch screen coupled to a touch sensor, a flexible display, a rollable display, a third-dimensional (3D) display, a display in which a plurality of display modules are physically connected, or the like.

The speaker 160 outputs audio data. For example, the speaker 160 may convert the digital audio data processed by the processor 130 into an analog audio data, amplify and output the analog audio data. For example, the speaker 160 may include at least one speaker unit, a D/A converter, an audio amplifier, or the like, capable of outputting at least one channel. In an embodiment, the speaker 160 may be implemented to output various multi-channel sound signals. For example, the processor 130 may output a feedback signal related to various operations of an electronic apparatus 100' through the speaker 160. For example, a feedback signal corresponding to an operation in which the operation is executed may be output through the speaker 160.

A camera 170 may perform capturing by being turned on according to a predetermined event. The camera 170 may convert the captured image into an electrical signal and generate image data based on the converted signal. For example, a subject may be converted into an electrical image signal through a charge coupled device (CCD) sensor, and the converted image signal may be converted into an amplified signal and a digital signal and then processed. According to an embodiment, the processor 130 may identify a gesture command of a user to execute the SoftAP function of the electronic apparatus 100' based on an image captured through the camera 170.

The microphone 180 is configured to receive a user voice or other sounds and convert the user voice or other sounds into audio data. In an embodiment, the processor 130 may receive a voice command of a user for executing the SoftAP function of the electronic apparatus 100' through the microphone 180. According to another embodiment, the electronic apparatus 100' may receive a user voice inputted through an external device through the communication interface 110.

Figure 14:
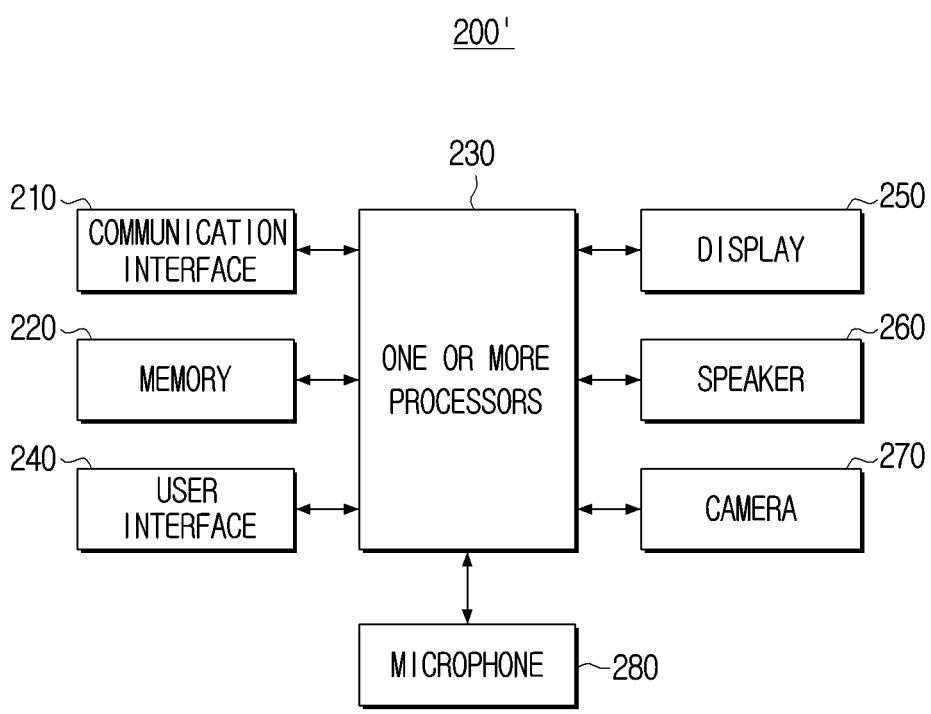
FIG. 14 is a block diagram illustrating an example of an electronic apparatus according to an embodiment.

FIG. 14 is a block diagram illustrating an example of an electronic apparatus according to an embodiment.

Referring to FIG. 14, an electronic apparatus 200' includes a communication interface 210, a memory 220, one or more processors 230, a user interface 240, a display 250, a speaker 260, a camera 270, and a microphone 280. Among the configurations shown in FIG. 14, a detailed description of the communication interface 210, the memory 220, and one or more processors 230, which are configurations overlapping with the configuration shown in FIG. 8, will be omitted. In addition, the rest of the configurations illustrated in FIG. 14, that is, the user interface 240, the display 250, the speaker 260, the camera 270, and the microphone 280 may be implemented in the same/similar manner as the user interface 140, the display 150, the speaker 160, the camera 170, and the microphone 180 illustrated in FIG. 13, and thus a detailed description thereof will be omitted.

In an embodiment, the processor 230 may control the display 250 to display a UI screen. Here, the UI may include various content play screens such as an image, video, text, music, etc., an application execution screen including various content, a web browser screen, a graphic user interface (GUI) screen, and the like.

In an embodiment, the processor 230 may provide a UI including various information related to the plurality of devices 10, 20, 30 and the server 50. In this case, the corresponding UI screen may be provided through the IoT application. In an embodiment, a UI screen provided through the IoT application may provide various information related to the operation of a plurality of devices 10, 20, 30, and may function as a control panel capable of inputting and outputting for control of a plurality of devices 10, 20, 30. That is, the UI screen may include an input interface for receiving an input of a user and an output interface for displaying information (e.g., control information) according to a user input, as the configuration for user and interface.

In an embodiment, the processor 230 may control the display 250 to provide the UI described in FIG. 11A. That is, the processor 230 may provide a UI including device information received from the server 50. Here, the device information may include a device to which Wi-Fi communication is not connected, based on updated AP information among the devices included in the target device list. For example, the UI may be provided through an execution screen of the IoT application. In an embodiment, the UI may be provided in the form of a notification provided through the IoT application.

According to various example embodiments described above, when AP information is updated and Wi-Fi connection of a plurality of devices is released, AP information of a plurality of devices may be automatically updated and Wi-Fi connected, thereby improving user convenience.

The methods according to various embodiments of the disclosure described above may be implemented in the form of an application that may be installed in an existing electronic apparatus. In an embodiment, at least some of the methods according to various embodiments of the disclosure described above may be performed using a deep learning-based artificial intelligence model (or deep artificial neural network), that is, a learning network model.

The methods according to the various embodiments as described above may be implemented as software upgrade or hardware upgrade for an existing electronic apparatus.

The various embodiments described above may be performed through an embedded server provided in an electronic apparatus, or an external server of at least one electronic apparatus and a display device.

The various embodiments of the disclosure may be implemented in software, including instructions stored on machine-readable storage media readable by a machine (e.g., a computer). An apparatus may call instructions from the storage medium, and execute the called instruction, including an image processing apparatus (e.g., electronic apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

In an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. In an embodiment or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While example embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. An electronic apparatus comprising:
a communication interface;
a memory storing at least one instruction; and
one or more processors operatively connected to the communication interface and the memory, and configured to execute the at least one instruction to:
control the communication interface to operate in an access point (AP) mode, based on first AP information, and
based on at least one external device being communicatively connected during operation of the communication interface in the AP mode, control the communication interface to transmit second AP information different from the first AP information to the at least one external device.

2. The electronic apparatus of claim 1, wherein the one or more processors are further configured to execute the at least one instruction to:
control the communication interface to terminate the AP mode, based on a preset event,
wherein the preset event comprises at least one of an event in which a preset time has elapsed after operating in the AP mode, an event in which a preset time has elapsed after transmitting the second AP information to the at least one external device, an event in which the second AP information is transmitted to each device in a target device list, or an event in which an end request of the AP mode is identified.

3. The electronic apparatus of claim 2, wherein the target device list is a list stored in the memory.

4. The electronic apparatus of claim 2, wherein the one or more processors further are configured to execute the at least one instruction to:
based on a communication connection based on the first AP information being released, obtain the second AP information from a user terminal through a Wi-Fi communication by executing SoftAP function, and obtain the target device list through the Wi-Fi communication; or
obtain the target device list from the user terminal through a communication method different from the Wi-Fi communication.

5. The electronic apparatus of claim 4, wherein the one or more processors are further configured to execute the at least one instruction to:
control the communication interface to transmit, to the user terminal, a request signal requesting whether to transmit the second AP information to the at least one external device; and receive from the user terminal, through the communication interface, the target device list as a response to the request signal.

6. The electronic apparatus of claim 2, wherein the one or more processors are further configured to execute the at least one instruction to:
communicate with a server, through the communication interface, via the AP device, based on the second AP information, to obtain the target device list from the server.

7. The electronic apparatus of claim 2, wherein the one or more processors are further configured to execute the at least one instruction to:
based on identifying a device not receiving the second AP information, from among the devices included in the target device list, after transmitting the second AP information to the at least one external device and the AP device ends, control the communication interface to communicate with the AP device based on the second AP information and control the communication interface to transmit the information about the identified device to the server.

8. The electronic apparatus of claim 2, further comprising:
a display;
wherein the one or more processors are further configured to execute the at least one instruction to:
after the AP mode is terminated, control the display to display a user interface comprising a device which is not connected by Wi-Fi communication, from among the devices included in the target device list, based on the second AP information.

9. The electronic apparatus of claim 1, wherein the one or more processors are further configured to execute the at least one instruction to:
based on a communication connection based on the first AP information being released, obtain the second AP information;
control the communication interface to perform communication with an AP device based on the second AP information; and
control the communication interface to operate in the AP mode, based on the first AP information.

10. The electronic apparatus of claim 1, wherein the one or more processors are further configured to execute the at least one instruction:
control the communication interface to operate in the AP mode, based on the first AP information and a preset event;
wherein the preset event comprises at least one of an event in which a communication connection based on the first AP information is identified as being released, or an event in which a user command for operating in an AP mode is identified based on the first AP information.

11. The electronic apparatus of claim 1, wherein the one or more processors are further configured to execute the at least one instruction to:
control the communication interface to operate in the AP mode based on a preset event;
wherein the preset event comprises at least one of an event in which a communication connection based on the first AP information is released in the at least one external device, or an event in which a user command to operate in the AP mode is identified based on the first AP information.

12. A method of controlling an electronic apparatus, the method comprising:

operating a communication interface of the electronic apparatus in an access point (AP) mode based on first AP information; and based on at least one external device being communicatively connected during operation of the communication interface in the AP mode, transmitting second AP information different from the first AP information to the at least one external device.

13. The method of claim 12, further comprising:

terminating the AP mode based on a preset event, wherein the preset event comprises at least one of an event in which a preset time has elapsed after operating in the AP mode, an event in which a preset time has elapsed after transmitting the second AP information to the at least one external device, an event in which the second AP information is transmitted to each device in a target device list, or an event in which an end request of the AP mode is identified.

14. The method of claim 13, further comprising:

based on the first AP information being released, obtaining the second AP information from a user terminal through a Wi-Fi communication by executing SoftAP function; and obtaining the target device list through the Wi-Fi communication.

15. The method of claim 14, further comprising:

transmitting a request signal to the user terminal, the request signal requesting whether to transmit the second AP information to the at least one external device; and receiving from the user terminal the target device list based on the request signal.

16. The method of claim 13, further comprising:

obtaining the target device list from a user terminal through a communication method different from a Wi-Fi communication.

17. The method of claim 12, wherein the operating the communication interface of the electronic apparatus in the AP mode comprises:

based on a communication connection based on the first AP information being released, obtaining the second AP information;

communicating with an AP device based on the second AP information; and operating the communication interface in the AP mode based on the first AP information.

18. The method of claim 17, further comprising:

communicating with a server, via the AP device, based on the second AP information, to obtain the target device list from the server.

19. The method of claim 17, further comprising:

based on identifying a device not receiving the second AP information, from among the devices included in the target device list, after transmitting the second AP information to the at least one external device and the AP device ends, communicating with the AP device based on the second AP information, to transmit information about the identified device, through the communication interface, to the server.

20. A non-transitory computer readable medium for storing computer readable program code or instructions which are executable by a processor to perform a method of controlling an electronic apparatus, the method comprising:

operating a communication interface of the electronic apparatus in an access point (AP) mode based on first AP information; and based on at least one external device being communicatively connected during operation of the communication interface in the AP mode, transmitting second AP information different from the first AP information to the at least one external device.

* * * * *